(12) United States Patent
Zwimpfer et al.

(10) Patent No.: US 11,369,191 B2
(45) Date of Patent: Jun. 28, 2022

(54) ORAL HYGIENE MEANS

(71) Applicant: Trisa Holding AG, Triengen (CH)

(72) Inventors: Martin Zwimpfer, Lucerne (CH); Kurt Bieri, Sursee (CH)

(73) Assignee: TRISA HOLDING AG, Triengen (CH)

( * ) Notice: Subject to any disclaimer, the term of this patent is extended or adjusted under 35 U.S.C. 154(b) by 208 days.

(21) Appl. No.: 16/624,965

(22) PCT Filed: Jun. 27, 2018

(86) PCT No.: PCT/EP2018/067287
§ 371 (c)(1),
(2) Date: Dec. 20, 2019

(87) PCT Pub. No.: WO2019/002386
PCT Pub. Date: Jan. 3, 2019

(65) Prior Publication Data
US 2020/0221860 A1     Jul. 16, 2020

(30) Foreign Application Priority Data

Jun. 27, 2017   (EP) .................................... 17178162

(51) Int. Cl.
| A46B 9/04 | (2006.01) |
| A46B 15/00 | (2006.01) |
| A46B 17/04 | (2006.01) |
| A46B 5/02 | (2006.01) |

(52) U.S. Cl.
CPC ................ *A46B 9/04* (2013.01); *A46B 5/026* (2013.01); *A46B 15/0087* (2013.01); *A46B 15/0089* (2013.01); *A46B 15/0097* (2013.01); *A46B 17/04* (2013.01); *A46B 2200/1066* (2013.01)

(58) Field of Classification Search
CPC ............ A46B 15/0097; A46B 15/0089; A46B 15/0087; A46B 17/04; A46B 9/04; A46B 2200/1066; A46B 5/026
See application file for complete search history.

(56) References Cited

U.S. PATENT DOCUMENTS

| 3,746,162 A | * | 7/1973 | Bridges .................. A46B 17/04 206/361 |
| D411,683 S | * | 6/1999 | Moskovich .................... D4/104 |
| 6,076,223 A | * | 6/2000 | Dair ........................ A46B 5/00 15/143.1 |

(Continued)

FOREIGN PATENT DOCUMENTS

| CN | 201557719 U | 8/2010 |
| CN | 203226418 U | 10/2013 |

(Continued)

OTHER PUBLICATIONS

Feb. 6, 2018 extended Search Report issued in European Patent Application No. 17178162.8.

(Continued)

*Primary Examiner* — Laura C Guidotti
(74) *Attorney, Agent, or Firm* — Oliff PLC

(57) ABSTRACT

An oral hygiene means, in particular a toothbrush, includes at least one application unit, at least one grip unit and at least one fastening unit that has at least one suction cup and is configured for an at least temporary fastening to surfaces. The suction cup has a non-circular cross section.

22 Claims, 18 Drawing Sheets

(56) References Cited

U.S. PATENT DOCUMENTS

Figure 1:
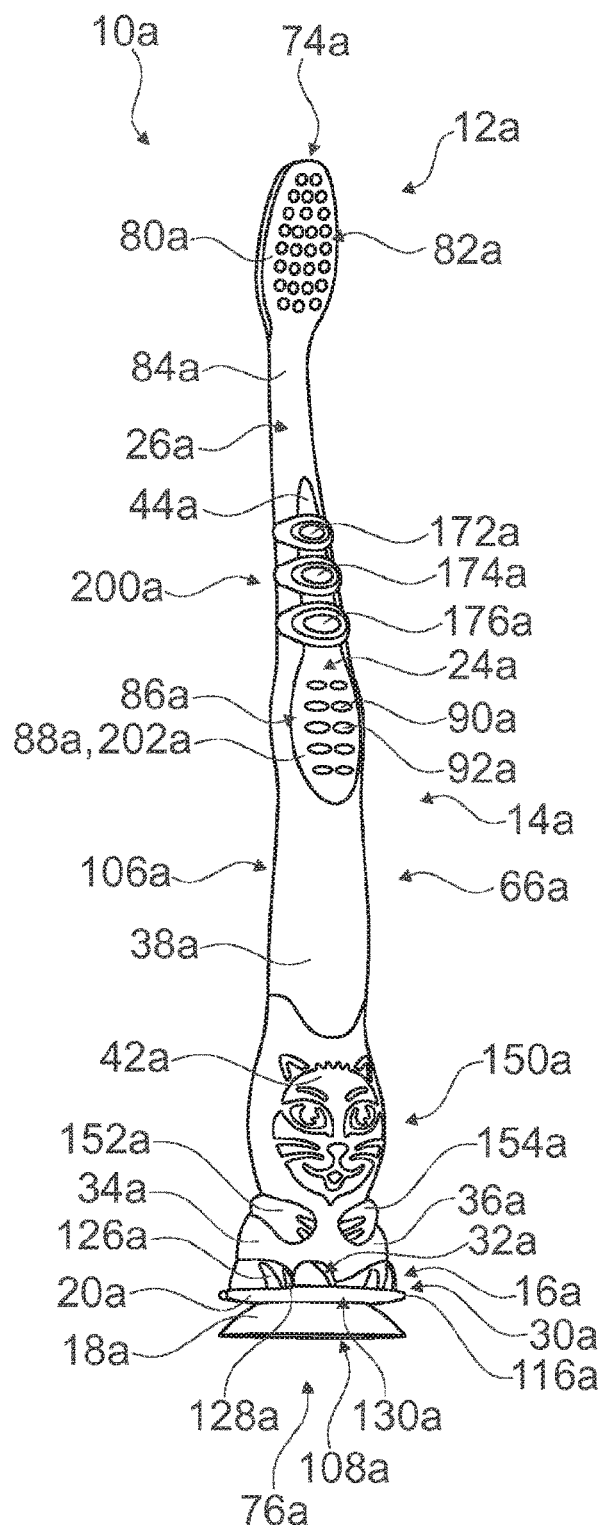

| | | |
|---|---|---|
| 9,521,899 B1 | 12/2016 | Tai |
| 2002/0100134 A1* | 8/2002 | Dunn ................. A46B 15/0097 |
| | | 15/167.1 |
| 2003/0008101 A1 | 1/2003 | Henderson |
| 2014/0173839 A1 | 6/2014 | Henderson |

FOREIGN PATENT DOCUMENTS

| | | |
|---|---|---|
| CN | 205993894 U | 3/2017 |
| EP | 0 611 533 A1 | 8/1994 |
| EP | 0 611 533 B2 | 7/2003 |
| JP | S61-30716 U | 2/1986 |
| WO | 2015/076809 A1 | 5/2015 |

OTHER PUBLICATIONS

Nov. 27, 2017 partial Search Report issued in European Patent Application No. 17178162.8.
Sep. 14, 2018 International Search Report issued in International Patent Application No. PCT/EP2018/067287.
Dec. 31, 2019 International Preliminary Report on Patentability issued in International Patent Application No. PCT/EP2018/067287.
Apr. 15, 2020 Office Action issued in European Patent Application No. 17 178 162.8.
Dec. 23, 2021 Office Action issued in European Patent Application No. 17 178 162.8.

\* cited by examiner

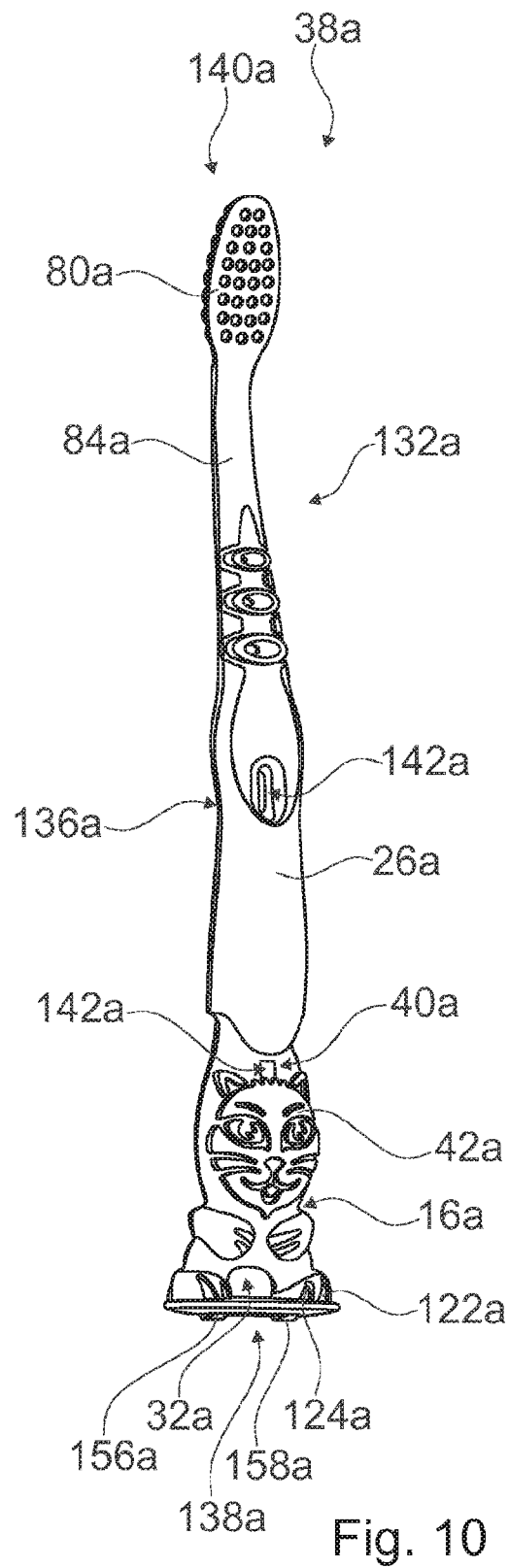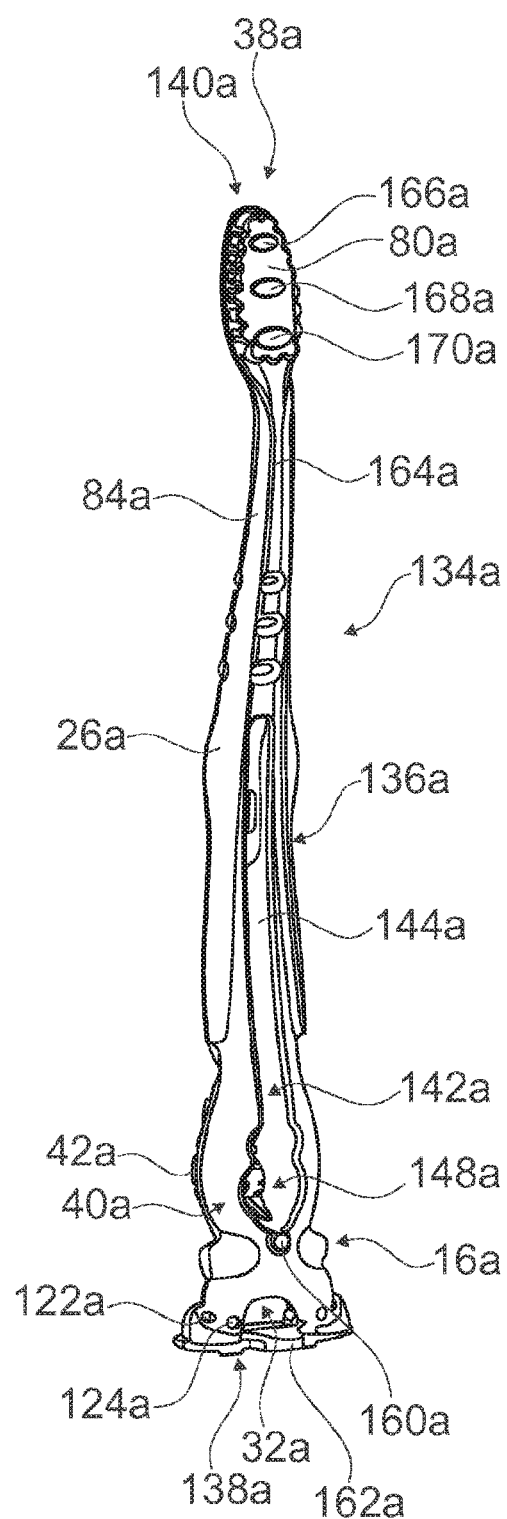

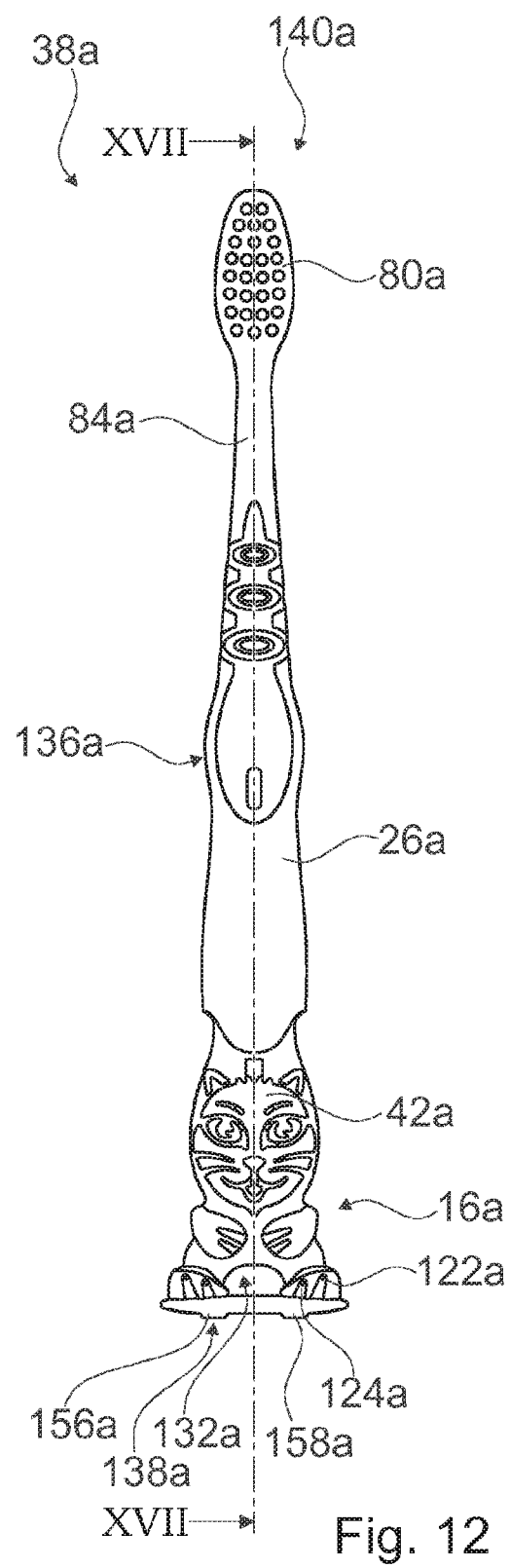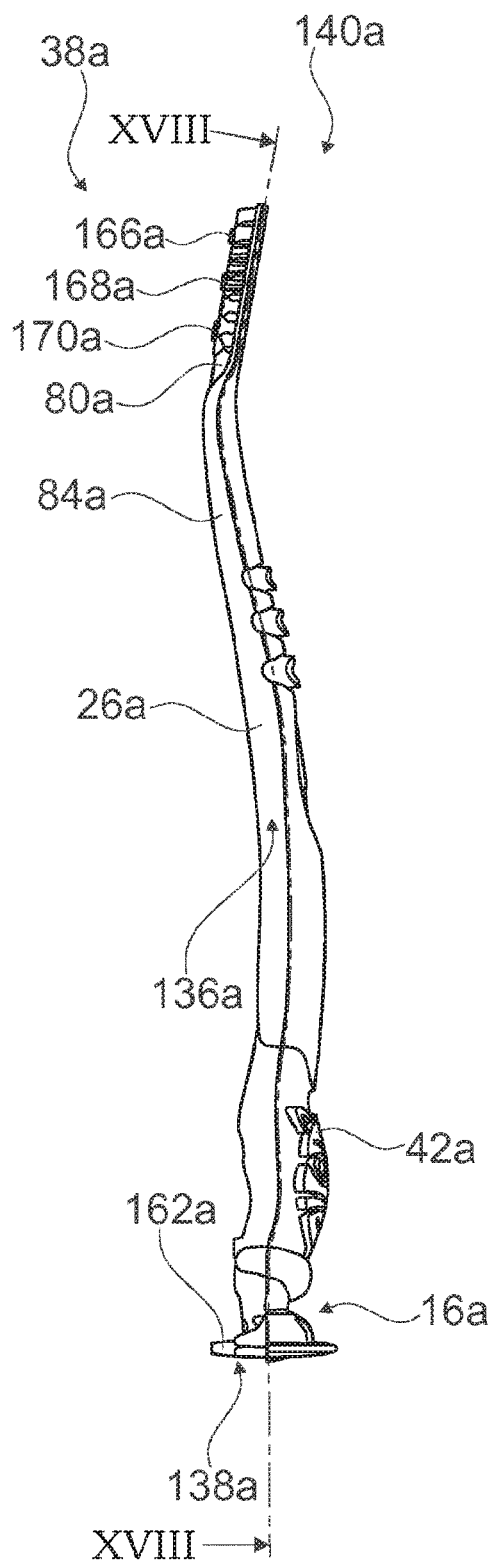
Fig. 12
Fig. 13

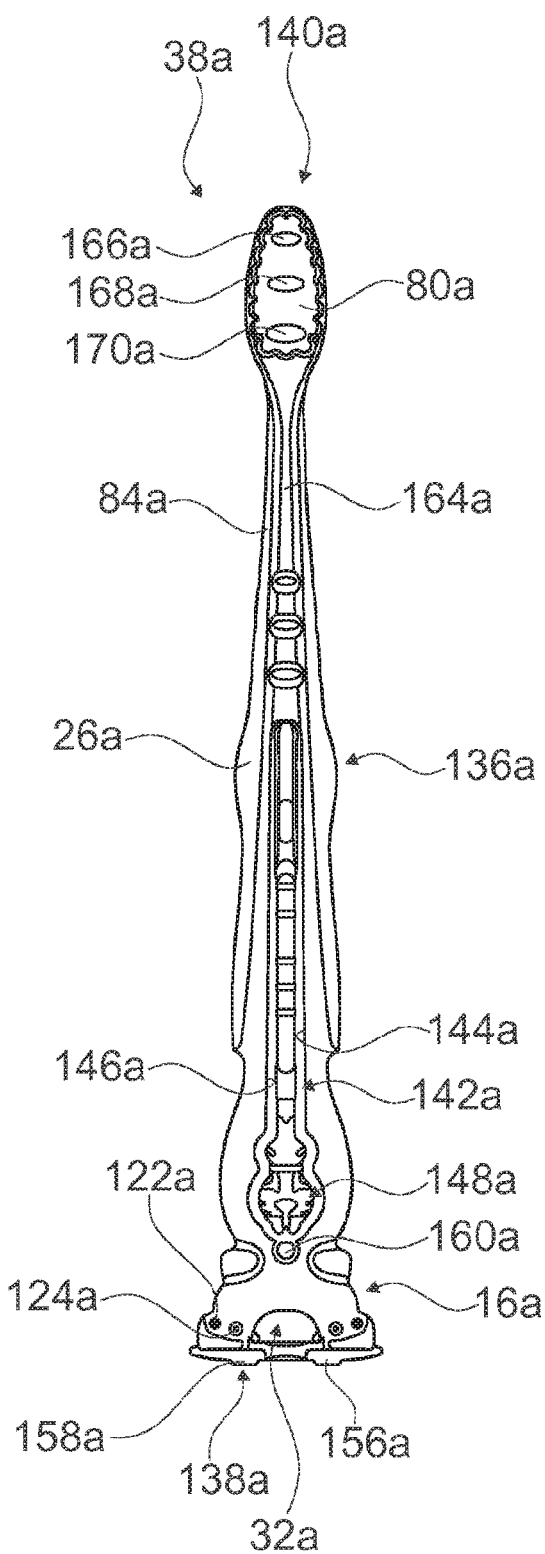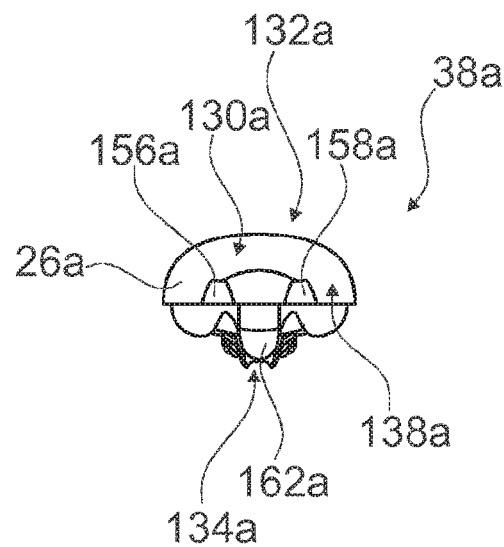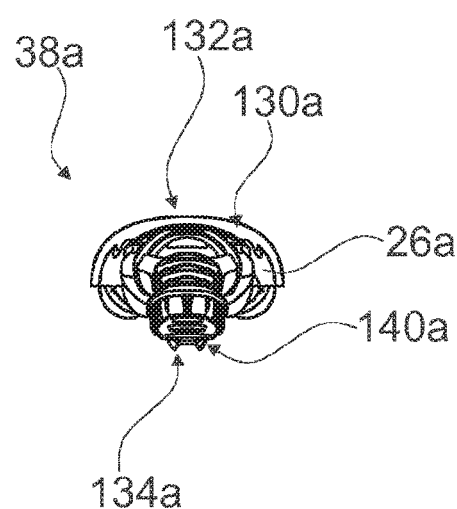
Fig. 14
Fig. 15
Fig. 16

ORAL HYGIENE MEANS

CROSS REFERENCE TO RELATED APPLICATIONS

This application is a U.S. national stage application of International Patent Application No. PCT/EP2018/067287 filed on Jun. 27, 2018 and is based on European Patent Application No. 17178162.8 filed on Jun. 27, 2017, the contents of which are incorporated herein by reference.

PRIOR ART

The invention relates to an oral hygiene means as claimed in the preamble of claim 1 and a protective cap for an oral hygiene means as claimed in the preamble of claim 22.

It is already known to store toothbrushes vertically or suspended, in particular for hygienic reasons. For example, circular suction cups as fastening means for toothbrushes are disclosed in EP 0 611 533B2, EP 0 960 284 B1, US 2002/0100134 A1 or WO 94/20006 A1. Such suction cups may be provided, for example, in a bottom region on a toothbrush in order to be able to fix said toothbrush temporarily to surfaces.

The object of the invention, in particular, is to achieve advantageous properties with regard to safe and/or hygienic storage and/or cost-effective producibility and/or ergonomic design. The object is achieved according to the invention by the features of claims 1, 5 and 22, whilst advantageous embodiments and developments of the invention may be derived from the subclaims.

ADVANTAGES OF THE INVENTION

The invention is based on an oral hygiene means, in particular a toothbrush, comprising at least one application unit, at least one grip unit and at least one fastening unit that has at least one suction cup and is configured for an at least temporary fastening to surfaces.

It is proposed that the suction cup has a non-circular cross section.

Alternatively or additionally, it is proposed that the fastening unit has at least one disk-shaped carrier element which is configured in at least one deposited state to prevent at least partially a deformation of the suction cup. The deformation is intended to be avoided by the carrier element being designed such that in the deposited state the suction cup is in contact with the bearing surface but is not deformed.

Advantageous properties with regard to safe and/or hygienic fastening and/or storage may be achieved by the design of the oral hygiene means according to the invention. In particular, a high fastening force may be achieved. Moreover, the oral hygiene means may be advantageously stored in a simple manner without the suction cup losing fastening force, for example due to an undesired deformation thereof. Moreover, the suction cup is advantageously protected from being damaged when the oral hygiene means is transported, namely during production, on the user in a pocket or a case or toilet bag, or the like. Moreover, an oral hygiene means may be provided with a fastening region which is compact and which at the same time permits a high force to be produced. Additionally, a fastening may be achieved by an adhesion to a surface, for example, the inadvertent release thereof being prevented by a high retaining force which, however, is able to be intentionally released in a simple manner, in particular due to a shape of the suction cup. Moreover, it is possible to provide a suction cup which has a large surface area and which at the same time permits a compact design of a handle. Moreover, a cost-effective producibility may be achieved. In particular, an oral hygiene means with a fastening function may be provided, advantageously the main body thereof being able to be produced cost-effectively in a separate injection-molding process.

An "oral hygiene means" is intended to be understood, in particular, as a toothbrush and/or an interdental cleaner and/or a flosser and/or a tongue cleaner and/or a toothpick. Advantageously, the oral hygiene means is realized as a toothbrush, in particular a manual toothbrush, preferably a children's toothbrush, advantageously a purely manual or a partially electrical and/or hybrid toothbrush, for example comprising a vibrating function or the like. In particular, the oral hygiene means differs from a fully electrical toothbrush. In this case, the oral hygiene means may be a disposable toothbrush, a reusable toothbrush or even a toothbrush with a replaceable head. The oral hygiene means, in particular, has a longitudinal axis which is advantageously arranged at least substantially parallel to a main direction of extent of the oral hygiene means. Preferably, the longitudinal axis runs at least section-wise within the oral hygiene means and, in particular, through the center of gravity thereof. In particular, the longitudinal axis of the oral hygiene means is a central axis of the oral hygiene means and/or a central axis of the grip unit. A "central axis" of an object is intended to be understood in this case, in particular, as an imaginary axis which runs inside the object parallel to a main direction of extent of the object and intersects the object on at most two points. "At least substantially parallel" is intended to be understood in this case as an alignment of a direction relative to a reference direction, in particular in one plane, wherein the direction has a deviation, in particular, of less than 80, advantageously of less than 50 and particularly advantageously of less than 20 relative to the reference direction. A "main direction of extent" of an object is intended to be understood in this case as, in particular, a direction which runs parallel to the longest edge of a smallest imaginary cuboid, which only just fully encloses the object.

In particular, the oral hygiene means has a length, in particular parallel to the longitudinal axis of the oral hygiene means, of at least 110 mm, advantageously of at least 130 mm and particularly advantageously of at least 150 mm and/or of at most 200 mm, advantageously of at most 190 mm and particularly advantageously of at most 180 mm, wherein naturally other, in particular smaller or larger, lengths are also conceivable. In particular, the oral hygiene means has a width, in particular parallel to a width axis of the oral hygiene means, advantageously perpendicular to the longitudinal axis and/or parallel to a main extension plane of the oral hygiene means and/or the grip unit, of at least 15 mm, advantageously of at least 20 mm and particularly advantageously of at least 23 mm and/or of at most 40 mm, advantageously of at most 35 mm and particularly advantageously of at most 31 mm. In particular, the oral hygiene means has a height, in particular measured parallel to a height axis of the oral hygiene means, advantageously measured perpendicular to the longitudinal axis of the oral hygiene means and/or perpendicular to the main extension plane of the oral hygiene means, of at least 10 mm, advantageously of at least 12 mm and particularly advantageously of at least 15 mm and/or of at most 30 mm, advantageously of at most 26 mm and particularly advantageously of at most 23 mm. The term "height" refers here, in particular, to a state of the oral hygiene means in which this oral hygiene means is stored, for example, on a surface such as a table top, a wash basin, an upper side of an item of furniture or the like, in particular such that the longitudinal axis is arranged parallel to the surface. A "main extension plane" of an object is intended to be understood, in particular, as a plane which is parallel to the largest side surface of a smallest imaginary cuboid which only just fully encloses the object and, in particular, runs through the central point of the cuboid.

Advantageously, the application unit comprises at least one cleaning region which is configured for a tooth cleaning application, in particular in an oral cavity of the user. Preferably, the cleaning region comprises at least one cleaning element, in particular at least one brush head, advantageously a toothbrush head, preferably comprising a plurality of bristles and/or bristle bundles. However, the cleaning element may also be implemented, for example, as an interdental brush and/or as a single tuft (for example a large individual bristle bundle) and/or as an arc spanned by dental floss, in particular as a flosser or the like. Moreover, the application unit advantageously comprises at least one neck element which is preferably connected to the cleaning element, in particular directly and/or in one piece. "In one piece" is intended to be understood, in particular, as connected at least by a material connection, for example by a welding process, an adhesive bonding process, an injection-molding process and/or a further process which is meaningful to the person skilled in the art, and/or advantageously shaped in one piece, such as for example by being produced from a casting and/or by being produced in a single-component or multi-component injection-molding method and advantageously from a single blank. "Configured" is in particular to mean specifically designed and/or equipped. By an object being configured for a specific function is intended to be understood, in particular, to mean that the object fulfils and/or performs this specific function in at least one application state or operating state.

The oral hygiene means, in particular, has a front face and a rear face which, in particular, are arranged remotely from one another. Preferably, the cleaning region is arranged on the front face of the oral hygiene means. The front face, in particular, is a visible side of the oral hygiene means in a viewing direction perpendicular to the longitudinal axis of the oral hygiene means and perpendicular to the width axis of the oral hygiene means. The rear face advantageously corresponds to a visible side of the oral hygiene means in a viewing direction opposite said front face. Moreover, the oral hygiene means has, in particular, an underside, the suction cup being advantageously arranged thereon. Additionally, the oral hygiene means has, in particular, an upper side advantageously arranged opposite the underside. The application unit is preferably arranged relative to the longitudinal axis of the oral hygiene means opposite the fastening unit.

Preferably, the grip unit has at least one grip element which is advantageously configured to be held by a hand, in particular by the hand of a child. Preferably, the grip element is implemented to be waisted, in particular repeatedly. This advantageously permits a secure hold and optimizes the ergonomics thereof. Particularly preferably, the grip element is of elongate configuration, wherein advantageously a longitudinal axis of the grip element corresponds to the longitudinal axis of the oral hygiene means. Advantageously, the grip element is implemented partially from a soft component and partially from a hard component. In particular, the grip element advantageously comprises at least one thumb grip region and/or at least one handle region. Advantageously, the thumb grip region is arranged on the front face of the oral hygiene means and, in particular, on a front face of the grip element. It is conceivable that the thumb grip region and/or the handle region have at least one element and/or a surface structuring made of a soft component.

Advantageously, the thumb grip region comprises at least one thumb grip element which is preferably implemented of the soft component and, in particular, on a surface of the oral hygiene means as a pocket which is made of the soft component and which is surrounded by the hard component. Advantageously, the thumb grip element forms at least one surface structure element, in particular a plurality of surface structure elements, advantageously arranged at regular intervals, whereby in particular an advantageous grip may be achieved. A surface structure element in this case is advantageously a raised portion which is implemented, in particular, with a flat surface and/or with straight side walls. Alternatively, it is also conceivable that a surface structure element tapers toward an upper side, in particular conically. Surface structure elements may be, for example, cylindrical, pyramidal, spherical segment-shaped, in particular semi-spherical, ovoid segment-shaped, or the like. A cross section of a surface structure element in this case may be made up of different geometric figures, for example from a semi-circle and an adjacent rectangle. Polygonal, in particular triangular, square, pentagonal or hexagonal cross sections are also conceivable. Moreover, any free form figures are conceivable. Preferably, the surface structure elements of the thumb grip element are implemented to be at least substantially identical to one another or at least geometrically similar.

In particular, the thumb grip element has a length, in particular at least substantially parallel to the longitudinal axis of the oral hygiene means, of at least 3 mm, advantageously of at least 5 mm and particularly advantageously of at least 10 mm and/or of at most 30 mm, advantageously of at most 25 mm and particularly advantageously of at most 18 mm. In particular, the thumb grip element has a width, in particular at least substantially perpendicular to the longitudinal axis of the oral hygiene means, of at least 3 mm, advantageously of at least 4 mm and particularly advantageously of at least 6 mm and/or of at most 15 mm, advantageously of at most 12 mm and particularly advantageously of at most 10 mm. An individual surface structure element has, in particular, a height, in particular perpendicular to a surrounding surface of the thumb grip element, of at least 0.1 mm, advantageously of at least 0.2 mm and particularly advantageously of at least 0.5 mm and/or of at most 2 mm, advantageously of at most 1.4 mm and particularly advantageously of at most 1 mm. Moreover, an individual surface structure element, in particular, has a length, in particular at least substantially perpendicular to the longitudinal axis of the oral hygiene means, of at least 0.7 mm, advantageously of at least 1 mm and particularly advantageously of at least 1.5 mm and/or of at most 6 mm, advantageously of at most 5 mm and particularly advantageously of at most 4 mm. Additionally, an individual surface structure element, in particular, has a width, in particular at least substantially parallel to the longitudinal axis of the oral hygiene means, of at least 0.3 mm, advantageously of at least 0.5 mm and particularly advantageously of at least 1 mm and/or of at most 5 mm, advantageously of at most 4 mm and particularly advantageously of at most 3 mm.

Preferably, in this case a main direction of extent of a surface structure element is respectively arranged at least substantially perpendicular to a main direction of extent of the thumb grip element. Moreover, advantageously the main direction of extent of the thumb grip element is arranged at least substantially parallel to the longitudinal axis of the oral hygiene means. Advantageously, at least two surface structure elements are arranged adjacent to one another along the longitudinal axis of the oral hygiene means and/or transversely thereto. Preferably, in the longitudinal direction at least three, advantageously at least four and particularly advantageously at least five, surface structure elements are preferably arranged in each case transversely to the longitudinal axis of the oral hygiene means with at least one further surface structure element which is implemented, in particular, mirror-symmetrically relative to the longitudinal axis of the oral hygiene means, in pairs adjacent to one another, in particular at regular intervals which are preferably smaller than a width of an individual surface structure element, wherein preferably a width and/or a length of centrally arranged surface structure elements is greater than a width and/or length of surface structure elements on the edge and the width and/or length particularly preferably increases toward the middle of the thumb grip element with each surface structure element. "At least substantially identical" objects are intended to be understood, in particular, as objects which are constructed such that in each case they are able to fulfil a common function and, apart from production tolerances, preferably differ in their construction at most by individual elements which are not essential to the common function, and advantageously as objects which, apart from dimensions and particularly advantageously at least apart from production tolerances and/or within the context of the possibilities of production technology, are implemented identically and/or geometrically similar, wherein identical objects are also intended to be understood, in particular, as objects which are symmetrical to one another.

Advantageously, the grip region has at least one handle element which is preferably implemented of a soft component and/or is arranged on the rear face of the oral hygiene means. Preferably, a main direction of extent of the handle element is arranged at least substantially parallel to the longitudinal axis of the oral hygiene means. The handle element, in particular, has a length, in particular at least substantially parallel to the longitudinal direction of the oral hygiene means, of at least 20 mm, advantageously of at least 30 mm and particularly advantageously of at least 40 mm and/or of at most 70 mm, advantageously of at most 60 mm and particularly advantageously of at most 50 mm. Moreover, the handle element, in particular, has a width, in particular at least substantially perpendicular to the longitudinal axis of the oral hygiene means, of at least 2 mm, advantageously of at least 3.5 mm and particularly advantageously of at least 5 mm and/or of at most 20 mm, advantageously of at most 15 mm and particularly advantageously of at most 12 mm. Advantageously, the handle element has at least one surface structure element, particularly advantageously a plurality of surface structure elements, which are implemented to be at least substantially identical or at least geometrically similar to the above-described surface structure elements of the thumb grip element. Preferably, the surface structure elements of the handle element, in particular, are arranged in pairs along the longitudinal axis of the oral hygiene means. Advantageously, the handle element has at least ten, advantageously at least 16, particularly advantageously at least 20 and preferably at least 24 surface structure elements, in particular in each case arranged in pairs. In this case, it is conceivable that a size and/or a spacing, in particular along the longitudinal axis of the oral hygiene means and/or transversely thereto, varies with a position of a surface structure element on the handle element.

The surface structure elements, which are arranged on an oral hygiene means on the front face and the rear face on the individual product, are preferably substantially identical in terms of shape.

Advantageously, the suction cup is at least partially, advantageously at least to a large part and particularly advantageously entirely, implemented of a soft component. Advantageously, a cross section of the suction cup is non-circular and/or not a circular ring, perpendicular to the longitudinal axis of the oral hygiene means and/or parallel to a positioning surface of the suction cup. In particular, the suction cup has a positioning surface which in a fastened state advantageously forms a sealing ring, which is not a circular ring. The positioning surface, in particular, is a contact surface of the suction cup with the surface in a suctioned state. In particular, the positioning surface encloses a region of the surface which together with the suction cup in the suctioned state defines an interior space of the suction cup which is placed under a vacuum. It is conceivable that, in addition to the positioning surface, further parts of the suction cup are in contact with the surface, for example an inner face of the suction cup, in a state under high contact pressure and/or in the case of an uneven surface. The positioning surface in this case is, in particular, a surface which in a state under light contact pressure, in which the suction cup is placed as intended onto the surface but an interior space of the suction cup is not yet partially evacuated, is configured for contact with the surface and/or is in contact therewith. Moreover, viewed parallel to the longitudinal axis of the oral hygiene means from the underside thereof, the suction cup has a non-circular outer contour. In principle, it is conceivable that the suction cup, for example, has a circular cross section in a region of the attachment thereof, in particular on a side of the suction cup opposing the positioning surface, wherein a cross section of the suction cup in this case alters in the direction of the positioning surface. Preferably, the suction cup is of bell-shaped configuration. The suction cup may have, for example, a wave-shaped and/or elongated and/or star-shaped and/or polygonal and/or rectangular and/or any other cross section, in particular perpendicular to the longitudinal axis of the oral hygiene means and/or a corresponding annular positioning surface, wherein corners, in particular, may be rounded and/or may be radiused. In particular, the suction cup has a cross section which increases in the direction of the positioning surface. In particular, the suction cup is not a circular and/or round suction cup. Preferably, the suction cup is realized in a one-part implementation. Advantageously, the suction cup is able to be produced, and advantageously is produced, by being joined together with other elements made of soft material, i.e. in one operating step. Advantageously, the fastening unit has a single suction cup. In principle, however, it is also conceivable that the fastening unit has a plurality of suction cups, in particular identical to one another, or even implemented differently. The expression "at least to a large part" is intended to be understood in this case, in particular, as at least 55%, advantageously at least 65', advantageously at least 75%, particularly preferably at least 85% and particularly advantageously at least 95% but in particular also entirely.

In particular, the positioning surface of the suction cup has a surface area of at least 40 mm$^2$, advantageously of at least 50 mm$^2$ and particularly advantageously of at least 70 mm$^2$, and/or of at most 150 mm$^2$, advantageously of at most 120 mm$^2$ and particularly advantageously of at most 100 mm$^2$ which is in particular configured for contact with the surface. In particular, the in particular annular positioning surface has a width, in particular an annular width, of at least 0.3 mm, advantageously of at least 0.5 mm, and particularly advantageously of at least 1 mm and/or of at most 2.5 mm, advantageously of at most 2 mm and particularly advantageously of at most 1.5 mm. In particular, the suction cup has a material thickness of at least 0.3 mm and particularly advantageously of at least 0.5 mm and/or of at most 2.5 mm, advantageously of at most 2 mm and particularly advantageously of at most 1.5 mm, in particular in a preferably bell-shaped suction region which is different from a region for the attachment of the suction cup.

Advantageously, the fastening unit is configured for fastening the oral hygiene means by means of the suction cup, in particular for being positioned and/or suctioned and/or suspended on surfaces, such as for example a table top, a surface, in particular upper side, of an item of furniture, a mirror, a washbasin, a shelf or the like. Additionally or alternatively, it is conceivable that the fastening unit contains an element which is configured for suspending the oral hygiene means, for example, on a hook and/or on a nail, or the like. Advantageously, at least in the case of fastening to a flat surface, in a fastened state of the suction cup to the surface the application unit is not in contact with the surface.

Advantageously, the carrier element has a non-circular cross section. In principle, however, a combination of a circular carrier element and a circular suction cup is also conceivable. Preferably, the carrier element is elongate and, in particular, wider than it is high. Preferably, the carrier element is roundish and/or rounded and, in particular, implemented as a roundish and/or rounded disk.

The fastening unit has, in particular, at least one base element which advantageously is at least partially implemented of a hard component. In particular, the base element comprises the carrier element. The base element may additionally be implemented at least partially of a soft component. Advantageously, the suction cup is fastened to the base element, in particular to the carrier element, and particularly advantageously connected thereto in one piece, in particular at least partially in a one-part implementation. Advantageously, the suction cup is connected in a planar manner to the base element and, in particular, to the carrier element, preferably by means of a material connection. Particularly advantageously, at least a large part of a connecting surface between the suction cup and the base element and/or, in particular, the carrier element comprises a soft component-hard component boundary surface. Preferably, the connecting surface is oval and/or rounded. The connecting surface, however, may also be round and have any other shape. Preferably, the connecting surface is flat and, in particular, not curved. In particular, the suction cup is at least connected to a soft component of the base element at least partially in a one-part implementation, and preferably produced in a common injection-molding process therewith. A first object and a second object being realized "at least partially in a one-part implementation" is in particular to mean that at least one element and/or part of the first object and at least one element and/or part of the second object are realized in a one-part implementation.

Advantageously, the fastening unit is realized at least partially in a one-part implementation with the grip unit. Particularly advantageously, the grip unit is embodied at least partially in a one-part implementation with the application unit. Preferably, the oral hygiene means has at least one, in particular just one, base body, which forms at least a portion of the fastening unit, the grip unit and the application unit. Advantageously, the base body is implemented of a hard component, whereby, in particular, a stabilizing structure may be produced cost-effectively, the geometry thereof advantageously being flexibly adaptable to a target application and at the same time fulfilling a plurality of functions. In particular, the base body forms all of the elements made of the hard component of the fastening unit and/or the grip unit and/or the application unit, advantageously the fastening unit, the grip unit and the application unit, at least apart from the cleaning elements and/or bristles of the application unit. In particular, the base body forms the base element of the fastening unit and/or the grip element of the grip unit and/or the neck element of the application unit and/or a bristle carrier of the cleaning element. Preferably, the base body forms at least a part of the carrier element. In particular, the carrier element is arranged in an end region of the base body. Preferably, the suction cup adjoins the end region, in particular directly. Advantageously, the base body has a single injection-molding point. Particularly advantageously, the injection-molding point of the base body is over-molded with soft components. The base body is able to be demolded and/or implemented free of undercuts advantageously in at least one direction and particularly advantageously in at least two, in particular opposing, directions. Preferably, the base body is implemented to be able to be demolded toward the front face and toward the rear face. Preferably, the base body has at least one through-hole, particularly advantageously a plurality of through-holes, which advantageously extend from the rear face to the front face. A through-hole in this case, in particular, is implemented such that a distribution of the soft component through the through-hole is possible in an injection-molding process. This through-hole may be implemented specifically such that on the rear face it forms a larger recess and through-holes which are different from this recess are present on the front face and/or different connections are formed across the recess. Thus isolated regions may be formed from soft material on the front face. In particular, the base body has at least one central through-hole which advantageously extends from the fastening unit to the grip unit, advantageously to an upper end of the grip unit, in particular parallel to the longitudinal axis of the oral hygiene means. The central through-hole in this case has, in particular, a length, in particular at least substantially parallel to the longitudinal axis of the oral hygiene means, of at least 30 mm, advantageously of at least 40 mm and particularly advantageously of at least 50 mm. Additionally, the central through-hole advantageously has a width, in particular at least substantially perpendicular to the longitudinal axis of the oral hygiene means, of at least 1 mm, advantageously of at least 2 mm and particularly advantageously of at least 3 mm. The central through-hole is advantageously at least section-wise implemented to be sword-shaped and/or may be produced by the use of an at least section-wise sword-shaped injection-mold.

An advantageous handlability and/or cost-effective producibility may be achieved, in particular, if the oral hygiene means comprises at least one, in particular just one, soft element made of at least one soft component which forms at least a portion of the fastening unit and the grip unit. Advantageously, the soft element forms the thumb grip element. Particularly advantageously, the soft element forms the handle element. Preferably, the soft element additionally forms at least a part of the application unit. In particular, it is conceivable that the soft element forms at least one cleaning element, namely a massage element, a tongue cleaner, such as in particular on the rear face of the oral hygiene means, or the like. Preferably, the soft element forms all of the elements made of the soft component of the fastening unit and/or the grip unit and/or the application unit, at least apart from the cleaning element and/or the bristles or the like. The soft component preferably forms at least one material connection with the hard component.

The deposited state is, in particular, a state in which the oral hygiene means is stored, in particular, on a flat and/or smooth, preferably planar, surface, in particular with the rear face of the oral hygiene means. Preferably in the deposited state the longitudinal axis of the oral hygiene means runs at least substantially parallel to the surface. Advantageously, in the deposited state, in particular relative to at least one extent in at least one direction, for example a length and/or a width and/or a height, the suction cup is deformed by less than 30%, particularly advantageously by less than 20%, preferably by less than 10% and particularly preferably by less than 5%. Advantageously, in the deposited state the carrier element prevents a deformation of the suction cup. In particular, in the deposited state the suction cup is not in contact with the surface. However, it is also conceivable that the suction cup is, in particular, slightly in contact with the surface, preferably without being deformed at the same time or at least only in a manner in which the suction cup is only partially deformed and, in particular, not substantially deformed. Advantageously, the carrier element has a length and/or a width which is 3 times, advantageously at least 5 times and particularly advantageously at least 10 times, as large as a height and/or a thickness of the carrier element. Advantageously, the carrier element is implemented to be board-like, surfboard-like and/or snowboard-like. Advantageously, a main extension plane of the carrier element is arranged at least substantially perpendicular to the longitudinal axis of the oral hygiene means. A slightly oblique position of the carrier element might also be conceivable. Preferably, the carrier element is implemented at least partially in a one-part implementation with the suction cup and/or at least partially in a one-part implementation with the grip element. Advantageously, the carrier element is arranged, in particular, directly above the suction cup. "At least substantially perpendicular" is intended to be understood here as an orientation of a direction relative to a reference direction, in particular in a reference plane, wherein the direction and the reference direction enclose an angle which, in particular, deviates by less than 80, advantageously by less than 50 and particularly advantageously by less than 20 from a right-angle.

Virtually any hard components and soft components which the person skilled in the art may expediently combine and/or select in a suitable manner, are relevant within the scope of this disclosure. Encompassed as the hard component are, for example, styrene polymers such as styrene acrylonitrile (SAN), polystyrene (PS), acrylonitrile butadiene styrene (ABS), styrene methyl methacrylate (SMMA), styrene butadiene (SB) or the like. Moreover, a hard component may comprise polyeolefins such as polypropylene (PP), polyethylene (PE) or the like, in particular also in the forms of high-density polyethylene (HDPE) or low-density polyethylene (LDPE). Additionally, polyesters such as for example polyethylene terephthalate (PET), in particular in the form of acid-modified polyethylene terephthalate (PETA), glycol-modified polyethylene terephthalate (PETG), polybutylene terephthalate (PBT), acid-modified polycyclohexylenedimethylene terephthalate (PCT-A), glycol-modified polycyclohexylenedimethylene terephthalate (PCT-G), or the like are relevant. Moreover, a use of cellulose derivatives such as for example cellulose acetate (CA), cellulose acetate butyrate (CAB), cellulose propionate (CP), cellulose acetate phthalate (CAP), cellulose butyrate (CB) or the like is conceivable. Moreover, a hard component may comprise, for example, polyamide (PA) such as PA 6.6, PA 6.10, PA 6.12 or the like, polymethyl methacrylate (PMMA), polycarbonate (PC), polyoxymethylene (POM), polyvinylchloride (PVC), polyurethane (PUR), polyamide (PA) or the like. In particular, polyethylene (PE) and/or polyurethane (PU) may be used as the hard component and/or as the soft component. In particular, a hard component has a modulus of elasticity of at least 1000 N/mm$^2$, and advantageously of at least 1300 N/mm$^2$ or of at most 2400 N/mm$^2$ and advantageously of at most 1800 N/mm$^2$.

Advantageously, hard components are used for stable and/or structure-bearing elements, in particular in the grip element and/or in a carrier element of the application unit and/or the fastening unit, or the like.

Preferably, the oral hygiene means or at least a base body of the oral hygiene means has a single hard component which may be implemented of one of the aforementioned materials or even from a mixture thereof. However, combinations of different hard components are also conceivable, wherein these may be processed, for example, in a two-component and/or multi-component injection-molding process and/or bonded and/or welded together, in particular welded ultrasonically. Alternatively or additionally, it is possible to use a plurality of hard components which in a two-component and/or multi-component injection-molding process do not form a material connection. In particular, it is conceivable that in this case a positive connection is produced between hard components, for example, in the form of at least one undercut and/or at least one through-hole and/or at least one, at least partial, encapsulation by injection-molding or the like. In this case, it is conceivable that, for example, a second hard component, which in particular is injection-molded onto a first hard component, shrinks and/or contracts after the injection-molding and advantageously forms a shrink connection. Suitable combinations may be, for example, polypropylene-polyester, polypropylene-styrene acrylonitrile or other combinations.

For example, thermoplastic styrene elastomers (TPE-S), such as for example a styrene-ethylene-butylene-styrene-copolymer (SEBS), a styrene-butadiene-styrene-copolymer (SBS) or the like are relevant as soft components. Additionally, a use of thermoplastic polyurethane elastomers (TPE-U), thermoplastic polyamide elastomers (TPE-A), thermoplastic polyolefin elastomers (TPE-O), thermoplastic polyester elastomers (TPE-E) or the like are conceivable. Moreover, a soft component may comprise, for example, at least one silicone. Advantageously, a soft component has a Shore-A hardness of at most 90, advantageously of at most 50 and particularly advantageously of at most 30. Preferably, at least one soft component forms at least one material connection with at least one hard component, in particular in at least one two-component and/or multi-component injection-molding process, advantageously by means of at least one over-molding process and/or by being encapsulated by injection-molding.

Advantageously, it is conceivable that a hard component used and a soft component used have different colors, so that surface structures, lettering, motifs and the like, may be produced by means of a suitable design of the base body and soft element.

The application unit advantageously has at least one cleaning element, in particular a toothbrush head, with bristles. Advantageously, the cleaning element additionally has at least one bristle carrier, for example a brush head base body. Advantageously, at least some or all of the bristles are conventionally extruded bristles. In this case, bristles may comprise, in particular, at least one hard component and/or at least one soft component. Preferably, the bristles are at least partially or entirely produced from polyamide (PA) and/or from polyester (PBT), wherein any other materials are conceivable. It is also conceivable that at least some of the bristles have a tapering and/or a changeable cross section. Preferably, the bristles are implemented of a single, in particular also a mixed, material. However, bristles having a plurality of components which are able to be produced and/or are produced, in particular, by means of at least one coextrusion, are also conceivable. The bristles may, for example, be produced by means of extrusion, cutting to length and/or post-treatment.

In particular, cylindrical bristles are relevant, wherein any other cross sections such as for example polygonal, triangular, rectangular, square, elliptical, star-shaped, trapezoidal, parallelogram-shaped, rhombus-shaped or any other cross sections are conceivable. In particular, different bristles in a bristle bundle, but also different bristle bundles, in particular with a specific type of bristles, may be used in each case. Bristles and/or bristle bundles in this case may be arranged in a regular manner but also in an irregular manner. In particular, bristles and/or bristle bundles which are arranged in groups and/or adjacently may differ with regard to at least one feature, such as for example a length, a diameter, a material, a color, a material hardness, a geometry, a sharpness, and the like, in particular alternately. Preferably, the bristles have a diameter, in particular perpendicular to the longitudinal axis thereof, of at least 0.075 mm and/or of at most 0.25 mm. Advantageously, the bristles have a cross-sectional surface, in particular perpendicular to the longitudinal axis thereof, of 0.002 mm$^2$ and/or of at most 0.2 mm$^2$. In the case of bristles which are used in the cosmetic field, for example bristles of an additional application element, thinner bristles and/or bristles with a smaller cross section may also be used. In the case of tapered bristles, in particular polyester (PBT) is suitable as a material, wherein a tapering may be mechanically and/or chemically produced. Other materials, however, are also conceivable. Preferably, the bristles in the longitudinal direction are straight, but wave-shaped and/or twisted and/or coiled and/or rotated bristles are also conceivable and, in particular, made up of a combination of different bristles. Bristles with a smooth surface are also conceivable, as are bristles with a textured surface.

Moreover, bristles, in particular as a bristle bundle, are preferably processed by means of at least one anchor punching process, anchor free tufting (AFT), in-mold tufting (IMT), a PTt method or the like, in particular fastened from the bristle carrier. Preferably, the bristle carrier has a plurality of bristle receivers, in particular holes for bristle bundles, which are, in particular, drilled and/or molded in an injection-molding process. In the case of anchor punching, for example, it is conceivable that initially a base body, in particular made from a hard component, preferably of the application element and/or the brush head, is produced by means of an injection-molding process, wherein advantageously blind holes for bristle bundles are formed in the injection-molding process. Naturally, however, subsequent drilling of blind holes is also conceivable. Preferably, bristles and/or bristle bundles are subsequently folded and fastened by means of at least one anchor in one respective blind hole, in particular by being punched in. Loop punching is also conceivable.

Alternatively, as mentioned above, anchorless methods are also conceivable, wherein advantageously bristles and/or bristle bundles are not folded. Bristles and/or bristle bundles in this case have approximately half the length in comparison with anchor punching. For example, it is conceivable that bristle bundles are initially separated, bristle bundles are fused together and/or bristle ends, in particular, are encapsulated by injection-molding for the fastening thereof. In this case, advantageously bristle bundles may be combined together. In this case, a production by means of in-mold tuftings (IMT) is possible, wherein advantageously, during the encapsulation by injection-molding of the bristle ends, a base body is formed, for example of the brush head and/or the grip unit and/or the fastening unit. It is also conceivable that, in particular, during the course of an integrated anchorless production process, plates or the like are initially injection molded around the bristles and these plates are in turn subsequently encapsulated by injection-molding, for example in order to form the brush head and/or the grip unit.

Initially by means of injection-molding, it is also conceivable to produce bristle plates with through-holes, the bristles being subsequently passed therethrough. Preferably, the bristles are subsequently connected, in particular fused, onto a rear face, preferably to one another and/or to the corresponding bristle plate. In this manner, bristle plates provided with bristles may be welded and/or bonded to a base body, in particular a brush head, preferably by means of ultrasonic welding. AFT (anchor free tufting by G.B. Boucherie nv) which, in particular, permits a combining of bristle bundles may be cited as a known production method in this connection.

A production, in particular an injection-molding, of a brush head with through-holes for bristles is a further method for anchor-free bristle covering. Bristles may then be passed through the through-holes and fused onto a rear face, in particular together and/or to the brush head. Preferably, an overmolding is then carried out, in particular with at least one soft component, of the fused regions and/or of the brush head. In this case, for example, an AMR method (from G.B. Boucherie nv) which, in particular, does not permit bristle bundles to be combined or an AMR+ method which, in particular, permits bristles to be combined, are relevant.

Additionally, it is conceivable initially to produce a brush head with blind holes, for example by means of injection-molding and/or by drilling the blind holes. In this case bristles are, in particular, laid together in bundles and fused at one end and/or connected by other means. The brush head is then, in particular, heated to a glass temperature of its material. Thus advantageously bristle bundles may be inserted into the blind holes and by means of contact pressure anchored to the brush head. In particular, in this case the heated blind holes are deformed so that the bristle bundles are anchored therein. In this case, for example, a known PTt method (from G.B. Boucherie nv) is relevant.

As an alternative or in addition to punched and/or bonded bristles, injection-molded bristles are also conceivable. These may be produced, in particular, in a multi-component injection-molding process together with the application unit, the grip unit and/or the fastening unit, or retrospectively on a base body of the application unit.

Preferably, the materials of the injection-molded bristles in an injection-molding process, in particular a two-component and/or multi-component injection-molding process, do not produce a material connection with the other soft components and/or hard components of the oral hygiene means. Preferably, injection-molded bristles are instead connected by means of a positive connection, for example by means of at least one undercut and/or at least one through-hole and/or by means of at least one at least partial encapsulation by injection-molding with soft components and/or hard components, wherein in particular a shrink connection and/or shrink-fit connection are conceivable. However, a connection by means of at least one material connection is also conceivable.

In principle, a single-component, two-component and/or multi-component injection-molding process is conceivable for all of the aforementioned possible injection-molding processes. The materials used, in particular different soft components and/or hard components in this case, as mentioned above, may be connected and/or are connected by a material connection and/or positive connection. Moreover, it is conceivable to form articulated connections by means of suitable injection-molding steps. In principle, for example, a hot channel method, a cold channel method and/or co-injection method are relevant.

Alternatively or additionally to a cleaning element embodied as a brush head, the application unit may also have at least one tongue cleaner and/or at least one cleaning and/or massage element. These elements may be implemented in each case of a soft component, from a hard component or from a combination of soft and hard components and/or are advantageously producible and/or produced by means of injection-molding. Preferably, injection-molded bristles are at least partially and advantageously entirely implemented of a thermoplastic polyurethane elastomer (TPE-U). In this case, the use of a modified polyurethane elastomer (TPE-U) which advantageously may be modified even at higher temperatures is conceivable, in particular relative to improved flow properties and/or a rapid curing, in particular rapid crystallization. Naturally, however, other materials are also conceivable, for example, thermoplastic polyester elastomers (TPE-E), thermoplastic polyamide elastomers (TPE-A) or the like. Materials for injection-molded bristles advantageously have a Shore-D hardness of at least 0 and particularly advantageously of at least 30 and/or of at most 100 and advantageously of at most 80. In particular, a Shore hardness of a material of injection-molded bristles is advantageously greater than a Shore hardness of the remaining soft components used, for example for grip elements, massage elements, further cleaning elements, or the like.

In principle, a use of water-soluble polymers is also conceivable, for example for hard components, soft components, injection-molded bristles or other elements of the oral hygiene means. Also bio-plastics which, in particular, may be obtained from renewable raw materials may be used. In this case, in particular, maize, hemp, sugar, castor oil, palm oil, potatoes, wheat, sugar beet, natural rubber, wood, castor plant, castor bean plant, and the like are relevant as raw materials. Corresponding possible basic materials could be, for example, cellulose, starch, lactic acid (PLA), glucose, chitin, chitosan or the like, from which, in particular, corresponding bioplastics may be synthesized.

In an advantageous embodiment of the invention it is proposed that the suction cup is oval. Preferably, the suction cup is an oval suction cup. Advantageously, the suction cup and/or the interior space of the suction cup is ovoid segment-shaped and, in particular, not spherical segment-shaped. Preferably, the suction cup is elongated. In particular, the cross section of the suction cup is oval, in particular an oval ring. Advantageously, the suction cup is oval, in a view along the longitudinal axis of the oral hygiene means, in particular on the underside of the oral hygiene means. Preferably, the suction cup is embodied mirror-symmetrically, advantageously relative to at least two planes of symmetry arranged perpendicular to one another. Preferably, the oval cross section of the suction cup has two opposing first curvatures, in particular circular arcs, with a first radius of curvature, and advantageously two opposing second curvatures, in particular circular arcs, with a second radius of curvature, which in particular is smaller than the first radius of curvature. It is conceivable that the oval cross section has no straight partial portions. However, it is also conceivable that the oval cross section only has curvatures which oppose one another, in particular by 1800, and which are connected via straight partial portions. In particular, the cross section may be made up from a rectangle and/or square and laterally adjoining semi-circles. As a result, advantageously a surface area of a suction cup may be maximized, in particular, without limiting the handlability thereof.

In a particularly advantageous embodiment of the invention it is proposed that the suction cup has a width, in particular parallel to the width axis of the oral hygiene means, of at least 15 mm, advantageously of at least 20 mm and particularly advantageously of at least 23 mm and/or of at most 40 mm, advantageously of at most 35 mm and particularly advantageously of at most 31 mm. It is additionally proposed that the suction cup has a length, in particular parallel to the height axis of the oral hygiene means and in particular not parallel to the longitudinal axis of the oral hygiene means, of at least 10 mm, advantageously of at least 12 mm and particularly advantageously of at least 15 mm and/or of at most 30 mm, advantageously of at most 26 mm and particularly advantageously of at most 23 m. In particular, the suction cup has a height, in particular parallel to the longitudinal axis of the oral hygiene means and in particular not parallel to the height axis of the oral hygiene means, of at least 1 mm, advantageously of at least 2 mm and particularly advantageously of at least 3 mm and/or of at most 12 mm, advantageously of at most 9 mm and particularly advantageously of at most 6 mm. Moreover, the interior space of the suction cup, in particular, has a width of at least 10 mm, advantageously of at least 15 mm and particularly advantageously of at least 20 mm and/or of at most 40 mm, advantageously of at most 35 mm and particularly advantageously of at most 28 mm. Moreover, the interior space of the suction cup advantageously has a length of at least 5 mm, advantageously of at least 10 mm and particularly advantageously of at least 12 mm and/or of at most 30 mm, advantageously of at most 25 mm and particularly advantageously of at most 20 mm. In particular, the interior space of the suction cup has a height of at least 1 mm, advantageously of at least 1.5 mm and particularly advantageously of at least 2.5 mm and/or of at most 8 mm, advantageously of at most 6 mm and particularly advantageously of at most 4.5 mm. The specified dimensions refer in this case, in particular, to an undeformed and/or unsuctioned state of the suction cup. As a result, advantageously a high fastening force, in particular due to a large positioning surface and/or a large interior space, may be advantageously achieved, combined with a space-efficient design.

The suction cup forms in the unloaded state (if, for example, it stands on a surface without being suctioned) a volume of 600 mm$^3$ to 1000 mm$^3$, preferably of 750 mm$^3$ to 850 mm$^3$ and/or encloses this volume, in particular together with the surface.

In the suctioned state the suction cup has a width, in particular parallel to the width axis of the oral hygiene means, of at least 15 mm, advantageously of at least 20 mm and particularly advantageously of at least 27 mm and/or of at most 40 mm, advantageously of at most 35 mm and particularly advantageously of at most 31 mm. Additionally, it is proposed that the suction cup in the suctioned state has a length, in particular parallel to the height axis of the oral hygiene means and in particular not parallel to the longitudinal axis of the oral hygiene means, of at least 10 mm, advantageously of at least 12 mm and particularly advantageously of at least 17 mm and/or of at most 30 mm, advantageously of at most 26 mm and particularly advantageously of at most 23 mm.

In a further implementation of the invention, it is proposed that the suction cup is realized at least partially in a one-part implementation with the grip unit. In particular, the soft element forms the suction cup. Advantageously, at least one element of the grip element is embodied of a soft component in a one-part implementation with the suction cup. Advantageously, the suction cup is injection-molded to the base body, in particular to the base element of the fastening unit. As a result, a cost-effective production may be achieved. In particular, a suction cup may be entirely injection-molded and advantageously does not have to be attached in a separate operating step.

Moreover, it is proposed that in the deposited state the carrier element defines at least one deposition point. In particular, the carrier element comprises the deposition point. Advantageously, the carrier element is configured in the deposited state to come into contact with a surface on which the oral hygiene means is stored. Advantageously, the carrier element has a deposition portion, in particular on the surface thereof, advantageously on a rear face of the oral hygiene means. Particularly advantageously, the deposition portion is implemented to be elongate and preferably in a linear manner and/or linear shape. Preferably, the deposition portion extends, in a view perpendicular to the longitudinal axis of the oral hygiene means, parallel to the main extension plane of the carrier element. In particular, the deposition portion is a part of an edge of the carrier element, in particular arranged on the rear face of the oral hygiene means. Advantageously, the oral hygiene means is able to be stored in a stable manner in at least one position, in particular without being rotated to the side, in each case on its front face and on its rear face. Preferably, an outer edge of the carrier element is implemented such that the oral hygiene means is rotated from any storage position, at least selected from an angular range of at least 175°, on a flat surface in which the longitudinal axis of the oral hygiene means is arranged parallel to the surface, in each case automatically into at least one of the two stable storage positions. As a result, advantageously a secure and/or hygienic storage of the oral hygiene means, in particular on the rear face thereof, may be permitted, wherein advantageously contact between a cleaning region and a surface on which the oral hygiene means is stored may be avoided.

Moreover, it is proposed that the carrier element is implemented partially of a soft component and partially of a hard component. In particular, the soft component forms a part of the carrier element. Additionally, the base body advantageously forms part of the carrier element. Preferably, the soft element and the base body together form the carrier element. Preferably, the deposition portion is implemented of the soft component. In particular, a rear face of the carrier element at least section-wise comprises the soft component. Advantageously, a front face and/or an edge of the carrier element on the front face are, in particular, entirely implemented of the hard component. Particularly advantageously, the rear face and/or a rear edge of the carrier element are, in particular, entirely implemented of the soft component. As a result, when stored on its rear face the oral hygiene means may be advantageously prevented from slipping. Additionally, the oral hygiene means may be stored in a stable manner, for example for applying toothpaste. In principle, the storage edge and/or the deposition point may also be formed from a hard component, wherein in this case the base body continues into the corresponding storage geometry.

It is further proposed that the carrier element has a thickness of at most 6 mm and advantageously of at most 4 mm and/or of at least 1 mm and advantageously of at least 2 mm. Preferably, the carrier element has a changeable thickness. In particular, the carrier element tapers toward its edge. However, a uniform thickness of the carrier element is also conceivable. In particular, the carrier element has a length, in particular parallel to the length of the suction cup, of at least 15 mm, advantageously of at least 20 mm and particularly advantageously of at least 23 mm and/or of at most 40 mm, advantageously of at most 35 mm and particularly advantageously of at most 31 mm. In particular, the carrier element has a width, in particular parallel to the width of the suction cup, of at least 10 mm, advantageously of at least 12 mm and particularly advantageously of at least 15 mm and/or of at most 30 mm, advantageously of at most 26 mm and particularly advantageously of at most 23 mm. Preferably, the carrier element is at least as long as and/or at least as wide as the suction cup. Preferably, the carrier element and the suction cup are arranged aligned with one another relative to the longitudinal axis of the oral hygiene means. As a result, advantageously a reliable protection of the suction cup may be achieved with low material consumption.

In an advantageous embodiment of the invention it is proposed that a cross section of the carrier element, in particular perpendicular to the longitudinal axis of the oral hygiene means, is adapted to a cross section of the suction cup, in particular perpendicular to the longitudinal axis of the oral hygiene means. In particular, an outer contour of the cross section of the carrier element is adapted to an outer contour of the cross section of the suction cup, at least in a view and/or projection along the longitudinal axis of the oral hygiene means. Advantageously, the cross sections and/or the outer contours are identical and/or geometrically similar and/or advantageously may transition into one another by means of at least one central extension. Advantageously, in a view along the longitudinal axis of the oral hygiene means, in particular on the underside of the oral hygiene means, a shaping of the suction cup corresponds to a shaping of the carrier element. Preferably, the carrier element is oval. In particular, the carrier element is embodied as an oval disk, preferably as a flat ovoid, in particular corresponding to or similar to the oval cross section of the suction cup. As a result, an edge of the suction cup may be advantageously protected on all sides from being pushed in.

Naturally, however, it is also conceivable that the carrier element has a different cross section from the suction cup, in particular a cross section which is dissimilar thereto. Thus, for example, the carrier element may be implemented to be polygonal and/or star-shaped and or angular, whilst the suction cup, for example, is oval or even vice versa.

In a particularly advantageous embodiment of the invention it is proposed that, in a view along a longitudinal axis, a cross section of the carrier element is at least as large as a cross section of the suction cup. Preferably, the cross section of the carrier element is implemented such that, in particular viewed along the longitudinal axis of the oral hygiene means, it encloses and/or entirely contains the cross section of the suction cup. The carrier element may, however, extend at some points or even along its entire edge beyond the suction cup. The carrier element forms a protection for the suction cup against deformation and damage.

Preferably, the carrier element at least partially and preferably entirely prevents a deformation of the suction cup in a further deposited state in which the oral hygiene means is stored on its front face. Advantageously, the oral hygiene means is rotatable about its longitudinal axis such that when rolled, in particular by 3600, over an outer edge of the carrier element, for example on a smooth surface, the suction cup does not deform or is only partially deformed. As a result, advantageously a secure storage is permitted and/or an undesired deformation and a loading of the suction cup associated therewith may be avoided. Additionally, a long service life of the suction cup may be achieved.

In connection with a cross section of the suction cup and a cross section of the carrier element, in this case in particular an undeformed and/or only slightly deformed state of the suction cup is referred to. It is conceivable that the suction cup in a suctioned and/or fastened state has a larger cross section than the carrier element. Preferably, the cross section of the suction cup in the undeformed state is similar to the cross section in the suctioned state and, in particular, only reduced according to a central extension relative thereto.

Additionally, it is proposed that the fastening unit defines at least one point of maximum width, in particular of the oral hygiene means, in particular parallel to the width of the suction cup. Advantageously, the carrier element and/or the suction cup define the point of maximum width. In particular, in the case that the suction cup and the carrier element have identical cross sections it is conceivable that the fastening unit defines a plurality of points of maximum width which, in particular, are arranged one above the other. Additionally, the fastening unit, in particular the carrier element and/or the suction cup, defines at least a point of maximum length, in particular of the oral hygiene means, in particular parallel to the length of the suction cup. As a result, advantageously a secure position in a fastened state may be achieved. Additionally, an oral hygiene means which may be hygienically and/or safely stored in different positions may be advantageously provided.

In a further embodiment of the invention, it is proposed that in the deposited state the soft element is configured to form all of the deposition points which are present. In particular, the soft element forms the deposition portion of the carrier element. Additionally, the soft element advantageously forms at least one further deposition portion which is advantageously arranged in a neck region of the application unit, in particular on the rear face thereof. Preferably, in the deposited state the oral hygiene means has two deposition regions which, in particular, are in contact with the surface. However, it is also conceivable that more than two deposition regions are present, for example in the case of a corresponding bulging and/or waisting and/or bending of the grip element. As a result, the oral hygiene means, when stored in particular on the rear face thereof, may be advantageously prevented from slipping off, so that advantageously a contamination of the cleaning region may be avoided and/or this cleaning region may be provided, for example, with toothpaste in a simple and/or convenient manner.

Moreover, it is proposed that the soft element extends at least on a rear face, in particular on the rear face of the oral hygiene element, in particular on the surface thereof, without interruption from the fastening unit via the grip unit to the application unit. Advantageously, the soft element extends without interruption from a lower end of the suction cup to the brush head. It is also conceivable, however, that the soft element section-wise runs inside the base body and, in particular, emerges therefrom on the rear face at different points which are, in particular, separate from one another on the surface, so that preferably pockets of soft component which are preferably surrounded by hard component are formed. As a result, a slip-proof grip and/or a neck region, with a flexibility which is adaptable in a flexible manner, may be advantageously produced in a cost-effective manner.

It is further proposed that the soft element in at least one region, preferably arranged on the front face of the oral hygiene means, between the neck element and a grip element, in particular the thumb grip element, of the grip unit, forms at least one element, preferably a plurality of elements, for example two or three or four or five, preferably three elements, which are at least partially supplied with the soft component from the rear face of the oral hygiene means, and are supplied therewith during production. Preferably, the element has at least one portion made of the hard component. In particular, the soft component and the base body together form the element. The soft component is, in particular, passed through the base body from the rear face to the front face, so that pockets made of a soft material are formed. The through-passage through the base body is designed in this case such that a conical funnel is formed in the base body. The tip of the cone is oriented in the direction of the rear face and the cone preferably has an oval basic shape. The external envelope of the cone is located at an angle of 20 to 150, preferably of 30 to 100, relative to its central axis. In the base body the front edges of the cone (on the front surface) are preferably not implemented to be rounded, whilst the edges on the rear face are implemented to be rounded. Since the soft material flows over these edges, the flow in the injection-molding process is improved. As a result, a geometry which is adaptable in many different ways may be advantageously provided. Additionally, greater user comfort may be achieved due to an intuitive identification of a grip region. The element is also provided with the soft component outside the part made of the hard component, and the soft component is thus realized on the surface transversely to the longitudinal direction toward the mold separating line but not connected to a further soft component.

It is further proposed that the soft element has a single injection-molding point. Preferably, the injection-molding point is arranged on the rear face of the oral hygiene means. Particularly preferably, the fastening unit has the injection-molding point. In particular, the injection-molding point is arranged above the carrier element and/or above the through-passage. In particular, a spacing between the injection-molding point of the soft element and the injection-molding point of the base body is less than 20 mm, advantageously less than 10 mm and particularly advantageously less than 5 mm. Preferably, the injection-molding point of the soft element is arranged in a region of the greatest mass of soft components. In particular, a spacing between the injection-molding point of the soft element and the suction cup is less than 40 mm, advantageously less than 30 mm and particularly advantageously less than 20 mm. As a result, a simple and/or cost-effective producibility may be advantageously achieved.

In an advantageous embodiment of the invention it is proposed that the fastening unit has at least one through-passage arranged above the suction cup. As a result, an additional suspension function may be advantageously provided. Additionally, a high level of stability in combination with a low material consumption may be advantageously achieved. Moreover, a high degree of variability regarding a geometry of the fastening unit may be advantageously achieved. In particular, the through-passage extends from the front face to the rear face of the oral hygiene means. The through-passage is preferably arranged from the direction of the suction cup, in particular directly behind the carrier element. Preferably, the carrier element defines the through-passage, at least on an underside of the oral hygiene means. Advantageously. the base body fully encompasses the through-passage, whereby this through-passage is stabilized, in particular.

In a particularly advantageous embodiment of the invention it is proposed that the through-passage is at least section-wise surrounded by a soft component. In particular, the through-passage is surrounded by the soft component on a side remote from the suction cup. Preferably, the soft element surrounds the through-passage on the side remote from the suction cup, particularly preferably over an angular range of at least 1200 and advantageously of at least 1500. Advantageously a partial portion of the carrier element defining the through-passage downwardly is implemented on a surface made of the hard component. As a result, in particular, an advantageous handlability may be achieved by the through-passage, in particular when suspended, for example, on a hook.

It is further proposed that the through-passage has an, in particular minimum, width, in particular at least substantially perpendicular to the longitudinal axis of the oral hygiene means, of at least 3 mm, advantageously of at least 4 mm and particularly advantageously of at least 6 mm and/or of at most 15 mm, advantageously of at most 12 mm and particularly advantageously of at most 9 mm. It is further proposed that the through-passage has an, in particular minimum, height, in particular at least substantially parallel to the longitudinal axis of the oral hygiene means, of at least 2 mm, advantageously of at least 3 mm and particularly advantageously of at least 4 mm and/or of at most 10 mm, advantageously of at most 8 mm, and particularly advantageously of at most 5 mm. Preferably, in a view from the front face and/or perpendicular to the longitudinal axis of the oral hygiene means the through-passage is circular segment-shaped, in particular semi-circular, and/or elliptical segment-shaped. As a result, a suspension function, which may be used in a simple manner, may be advantageously provided. Additionally, as a result, a high level of stability of the fastening unit may be achieved with at the same time a low material consumption.

It is further proposed that the fastening unit has at least one connection element which at least partially defines the through-passage and which is at least section-wise implemented of a hard component which is penetrated by at least one soft component. In particular, the connection element is penetrated by the soft component from the rear face to the front face. Advantageously, the connection element has at least two penetrations which comprise the soft component and which are advantageously formed by the through-passages of the base body injection-molded with the soft component. Preferably, the penetrations terminate in pockets which are made of the soft component and which are arranged on the front face of the oral hygiene means, and in particular the fastening unit, preferably directly above the carrier element. Advantageously, the fastening unit comprises two connection elements which define the through-passage from two sides. Preferably, the connection elements are implemented to be curved and, in particular, connected above the through-passage, so that together they define the through-passage to the side and on an upper side, whilst preferably the carrier element defines the through-passage from below. In particular, the connection elements and the carrier element together form the through-passage. Advantageously, the connection elements are connected to the carrier element and are, in particular, at least partially realized in a one-part implementation. Advantageously, the connection elements are embodied mirror-symmetrically to one another, in particular relative to a plane of symmetry containing the longitudinal axis and/or the height axis of the oral hygiene means.

It is further proposed that the base body forms at least one carrier structure arranged above the fastening unit, wherein at least one motif element, which is encapsulated by injection-molding with the soft component through the carrier structure, is formed integrally on said carrier structure. Preferably, the carrier structure defines the central penetration of the base body, in particular to the side. Preferably, the carrier structure is implemented to be droplet-shaped. Advantageously, viewed from the carrier element, the carrier structure is arranged behind the through-passage. Particularly advantageously, the motif element extends on a front face of the carrier structure over the central through-hole. In particular, the motif element at least section-wise bridges the central through-hole. In particular, the motif element, together with the soft component which has been encapsulated thereon by injection-molding and preferably together with the connection elements of the fastening unit, forms at least one motif of the fastening unit, for example in the form of an animal face, in particular with adjoining paws. In this case, it is conceivable that the connection elements of the fastening unit are implemented such that these connection elements form the legs, in particular with stylized claws made of the soft component, for the motif, said legs advantageously being located on the carrier element. The legs and paws in this case are advantageously formed such that these legs and paws have regions made of the hard component and regions made of the soft component on the surface thereof. Advantageously, the central through-hole and the motif element are implemented such that, when encapsulated by injection-molding with soft component, the soft component is passed from the rear face to the motif, such that the motif on the front face thereof is section-wise supplied with the soft component. If the hard component and the soft component are of different colors, differently colored regions of the motif are thus formed. In particular, the motif has a length, in particular at least substantially parallel to the longitudinal axis of the oral hygiene means, of at least 15 mm, advantageously of at least 20 mm and particularly advantageously of at least 25 mm and/or at most 60 mm, advantageously of at most 50 mm and particularly advantageously of at most 40 mm. In particular the motif has a width, in particular at least substantially perpendicular to the longitudinal axis of the oral hygiene means, of at least 10 mm, advantageously of at least 15 mm and particularly advantageously of at least 20 mm and/or at most 40 mm, advantageously of at most 35 mm and particularly advantageously of at most 30 mm. Additionally, a motif face region of the motif, in particular has a length, in particular at least substantially parallel to the longitudinal axis of the oral hygiene means, of at least 10 mm, advantageously of at least 15 mm and particularly advantageously of at least 20 mm and/or of at most 40 mm, advantageously of at most 35 mm and particularly advantageously of at most 30 mm. The motif face region additionally in particular has a width, in particular at least substantially perpendicular to the longitudinal axis of the oral hygiene means, of at least 7 mm, advantageously of at least 10 mm and particularly advantageously of at least 15 mm and/or of at most 35 mm, advantageously of at most 30 mm and particularly advantageously of at most 25 mm. As a result, a high degree of variability regarding a shaping may be achieved. Additionally, different shapes may be produced by using a common basic structure.

A wave-shaped structure may also be produced in the region of the brush head, said wave-shaped structure, for example, being based on the fact that the bristle holes are surrounded by minimal material, so that this structure is visible on the rear face of the brush head. In the finished product, this structure is preferably not visible since it is covered by the soft component. The soft component in the brush head preferably takes up ⅔ of the entire head height.

Further support elements, which when encapsulated by injection-molding may form a portion of a rear surface of the brush head, may be integrated on the rear face in the brush head. The support elements are advantageously configured for supporting the oral hygiene means and, in particular, for the ejection thereof during the production thereof. Moreover, the support elements are preferably configured for supporting the brush head when the bristle bundle is punched. The brush head in this case may be supported from the rear, so that it is not able to deflect the force acting thereon from the front, and advantageously the bristle bundles may be optimally fixed. If a brush head were to be encased by a soft component, it would possibly not function since the soft component would be damped and would also flex in a resilient manner.

Advantageously, the soft component finds its path from the grip unit via at least one channel in the neck element into the brush head.

In the transition region of the grip unit and the neck element, elements are advantageously incorporated into the grip which may have a structure made up of two components. Preferably, a plurality of similarly shaped elements may be arranged one behind the other. The elements advantageously differ in terms of size, and the size particularly advantageously decreases in the direction toward the head.

The elements are preferably of oval shape but they may also be of round or roundish shape. The elements are preferably constructed such that a filled core is formed, said filled core being made of the soft component and being defined by a ring made of the hard component. Outside this ring made of the hard component a further ring made of the soft component is advantageously formed, said further ring also being able to extend further to the side of the geometry of the neck element.

In particular, a core of the element on the surface of the finished product may have an extension in the longitudinal direction of the toothbrush of at least 1 mm, advantageously of at least 2 mm and of at most 6 mm, advantageously of at most 4 mm and particularly advantageously of at most 3 mm. The extension of the core of the element perpendicular to the longitudinal direction is in particular at least 2 mm, advantageously at least 3 mm and at most 9 mm, advantageously at most 7 mm and particularly advantageously at most 6 mm.

The ring around the core of the element advantageously has a width of at least 0.5 mm and particularly advantageously of at least 1 mm.

Preferably the elements at least partially contain structures which consist of the soft component. The soft component is advantageously guided through through-holes in the base body from the rear face of the base body to the front face. In this manner, the soft component may form isolated pockets on the front face of the base body.

The invention further relates to a protective cap for an oral hygiene means, in particular for a toothbrush, in particular for the oral hygiene means according to the invention, comprising at least one cap body, which is advantageously realized in a one-part implementation and which defines at least one interior space, which is configured for receiving at least a portion, preferably at least a portion of an application unit, of the oral hygiene means.

It is proposed that the cap body has a least one hanger.

By means of the design of the protective cap, advantageous properties regarding safe and/or hygienic fastening and/or storage may be achieved. In particular, safe and/or reliable suspension may be permitted. Moreover, advantageously a dual functionality which encompasses a safe enclosure and the possibility of a safe suspension may be achieved. Moreover, a cost-effective producibility may be achieved. In particular, a protective cap which comprises a suspension function and which may be advantageously produced cost-effectively in a single injection-molding process may be provided.

The protective cap is in particular configured for protecting and/or at least partially surrounding the application unit, in particular the cleaning region. Preferably, the protective cap is embodied as a toothbrush protective cap. In particular, the protective cap is configured for use with at least one manual toothbrush and/or with at least one partially electrical toothbrush. Advantageously, the protective cap has at least one through-passage, a neck region of the application unit penetrating the interior space through said through-passage in a positioned state on the oral hygiene means. In particular, the through-passage is dimensioned such that the cleaning region which is arranged in the interior space is not abled to be moved out of the interior space through said through-passage. In particular, the cap body is implemented to be openable in order to be placed on the cleaning region.

Preferably, the entire cleaning region and, in particular, the bristles and/or bristle bundle thereof is arranged in the positioned state inside the interior space. Preferably, the protective cap is realized in a one-part implementation. In particular, the cap body forms the protective cap. In particular, the cap body has a length of at least 20 mm, advantageously of at least 30 mm and particularly advantageously of at least 40 mm and/or at most 120 mm, advantageously of at most 90 mm and particularly advantageously of at most 60 mm. In particular, the cap body has a width of at least 10 mm, advantageously of at least 15 mm and particularly advantageously of at least 20 mm and/or at most 50 mm, advantageously of at most 40 mm and particularly advantageously of at most 30 mm. In particular, the cap body has a height of at least 10 mm, advantageously of at least 15 mm, and particularly advantageously of at least 20 mm and/or at most 50 mm, advantageously of at most 40 mm and particularly advantageously of at most 30 mm. Additionally, the cap body has, in particular, advantageously an at least substantially constant wall thickness of at least 0.3 mm, advantageously of at least 0.5 mm and particularly advantageously of at least 0.7 mm and/or at most 2.5 mm, advantageously of at most 2 mm and particularly advantageously of at most 1.3 mm.

Advantageously, the cap body has at least one ventilation hole. Particularly advantageously, the cap body has a plurality of ventilation holes, in particular embodied at least in pairs mirror-symmetrically to one another and/or arranged at regular intervals. Advantageously, at least some of the ventilation holes are implemented such that together they form a cap motif, namely a stylized face or at least parts thereof. Preferably, the ventilation holes are arranged at the side on the cap body. The cap body advantageously has a smooth surface, in particular for reasons of improved hygiene and/or reduced susceptibility to contamination, wherein surface structurings which, in particular, may form partial regions of the cap motif are also at least section-wise conceivable.

The cap body is advantageously implemented of any hard component, but preferably from polypropylene. It is also conceivable that the cap body is at least partially implemented of the soft component, wherein this is preferably TPE. In particular, the cap body is embodied as an injection-molded part. Moreover, it is conceivable that a material of the cap body comprises at least one mixture, for example of antibacterial material and/or charcoal and/or the like. Mixtures for aesthetic reasons, such as for example glitter and/or colored microparticles or the like, are also conceivable.

The hanger is advantageously of hook-shaped configuration. In particular, the hanger is curved toward the through-passage of the cap body. Advantageously, the hanger is of U-shaped configuration. Additionally, the hanger advantageously has a cross section tapering toward the end thereof. Additionally, the hanger is advantageously implemented to be waisted. Preferably, the hanger is embodied as a hollow body, the interior space thereof in particular being able to be connected to the interior space of the cap body. It is also conceivable that the hanger has at least one separating element which at least partially separates the interior space of the hanger from the interior space of the cap body. It is additionally conceivable that the hanger has at least one support portion made of the soft component at least on an inner face, which in particular is configured for bearing against a suspended position, such as for example a hook and/or a bar or the like. In principle, however, differently implemented hangers are also conceivable. For example, the hanger may be a magnetic hanger, a Velcro hanger, a suction cup hanger or the like. It is also conceivable that the hanger is configured for fastening to a mating element which is attachable to a suspended position and, in particular, forms together with the hanger a suspension system.

It is further proposed that the cap body has at least two shell elements which are connected to each other in an articulated manner and which in each case form a portion of the hanger. As a result, a cost-effective producibility and/or a comfortable handlability may be achieved. In particular, the cap body is able to be placed in a folded-up state on the cleaning region of the application unit. Preferably, the shell elements are connected to each other in an articulated manner in a region of the interior space of the cap body, in particular on the rear face, wherein in particular the hanger does not have an articulated connection. Preferably, an articulated connection is arranged between the shell bodies on a rear face of the cap body. Moreover, advantageously at least one closure unit is arranged on a front face of the cap body. Preferably, the closure unit forms at least one latching connection for the cap body. In particular, the closure unit is a part of the cap body and is preferably realized in a one-part implementation therewith. Advantageously, the closure unit comprises at least one first closure element, in particular a latching element, of a first shell body and in particular at least one second closure element, in particular a latching hook, of a second shell body. Advantageously the shell elements form, in particular apart from the closure element, in each case a mirror-symmetrical half of the cap body and in particular of the hanger. The closure unit is preferably produced in a pair of closure elements and it is also possible to produce the closure unit subdivided into several pairs of closure elements.

Advantageously, the shell elements are connected to each other by means of at least one, in particular by means of just one, film hinge. However, a combination of a plurality of film hinges arranged adjacent to one another, in particular spaced apart from one another, is also conceivable. The film hinge is arranged, in particular, on the rear face of the cap body. In particular, the film hinge has a length of at least 5 mm, advantageously of at least 10 mm and particularly advantageously of at least 15 mm and/or at most 35 mm, advantageously of at most 30 mm and particularly advantageously of at most 25 mm. The width of the film hinge, in particular between the two shells, in particular is at least 10 mm, advantageously at least 15 mm and particularly advantageously at least 20 mm and/or at most 40 mm, advantageously at most 35 mm and particularly advantageously at most 30 mm. In particular, the film hinge has a material thickness of at least 0.05 mm, advantageously of at least 0.1 mm, and particularly advantageously of at least 0.15 mm and/or of at most 0.7 mm, advantageously of at most 0.5 mm and particularly advantageously of at most 0.3 mm. Preferably, a material thickness of the film hinge varies and advantageously in an edge region is approximately 0.28 mm and/or in a central region, which is not necessarily arranged in the middle, is approximately 0.2 mm.

Preferably, the cap body is able to be produced and/or is produced by using a simple tool without core pullers, etc., in particular by means of at least one injection-molding process. Preferably, the cap body is produced in an open state, in which preferably the shell elements enclose an opening angle of 180°. In particular, in the open state the cap body is able to be demolded and/or is implemented to be free from an undercut in at least one direction, advantageously in two opposing directions, at least apart from the closure elements of the closure unit.

Advantageously, properties regarding hygienic and/or secure stowage may be achieved, in particular, with a system which comprises at least one oral hygiene means according to the invention and at least one protective cap according to the invention. In particular, the system comprises just one oral hygiene means and just one protective cap, in particular, placed thereon. Advantageously the oral hygiene means is able to be suspended in the positioned state of the protective cap by means of the hanger, in particular without the cleaning region thereof dropping out of the interior space.

Additionally, the invention comprises a method comprising and/or for producing an oral hygiene means according to the invention and/or a protective cap according to the invention and/or a system according to the invention. In particular, the method may comprise at least one method step in which the protective cap is placed on the oral hygiene means and advantageously closed, and preferably at least one method step in which the oral hygiene means is suspended by means of the hanger of the protective cap positioned thereon, for example on a hook, a screw, a nail, a handle or the like. It is also conceivable that the method comprises at least one method step in which at least part of the oral hygiene means and/or the protective cap is produced by means of at least one injection-molding method and/or by means of at least one bristle covering, wherein in this connection in particular reference is made to the above description.

The oral hygiene means according to the invention and the protective cap according to the invention are not intended to be limited in this case to the above-described applications and embodiments. In particular, for fulfilling of a mode of operation described herein, the oral hygiene means according to the invention and the protective cap according to the invention may have a number of individual elements, components and units which differs from the number cited herein and/or any meaningful combination thereof. Additionally, the value ranges specified in this disclosure, and the values within the cited limits, are regarded as disclosed and able to be used in any manner.

DRAWINGS

Further advantages are disclosed from the following description of the drawings. Exemplary embodiments of the invention are shown in the drawings. The drawings, the description and the claims contain numerous features in combination. The person skilled in the art will expediently consider the features individually and combine them together to form further meaningful combinations.

Figure 2:
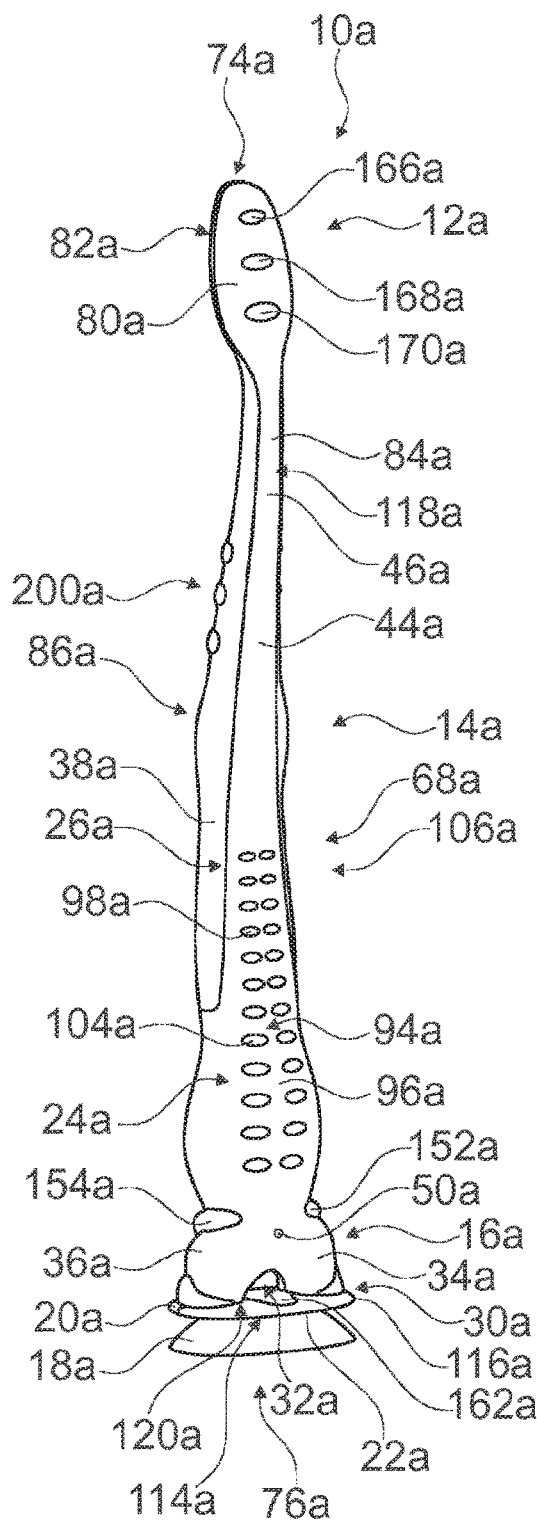
Figure 3:
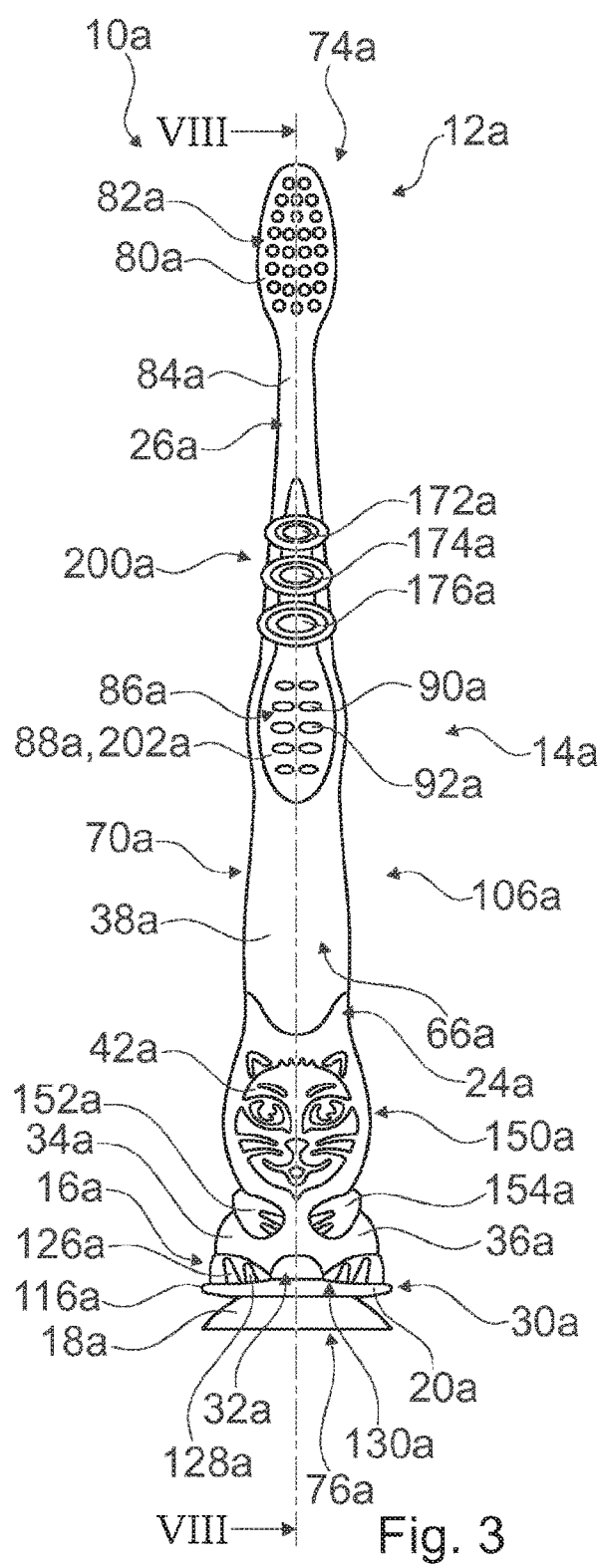
Figure 4:
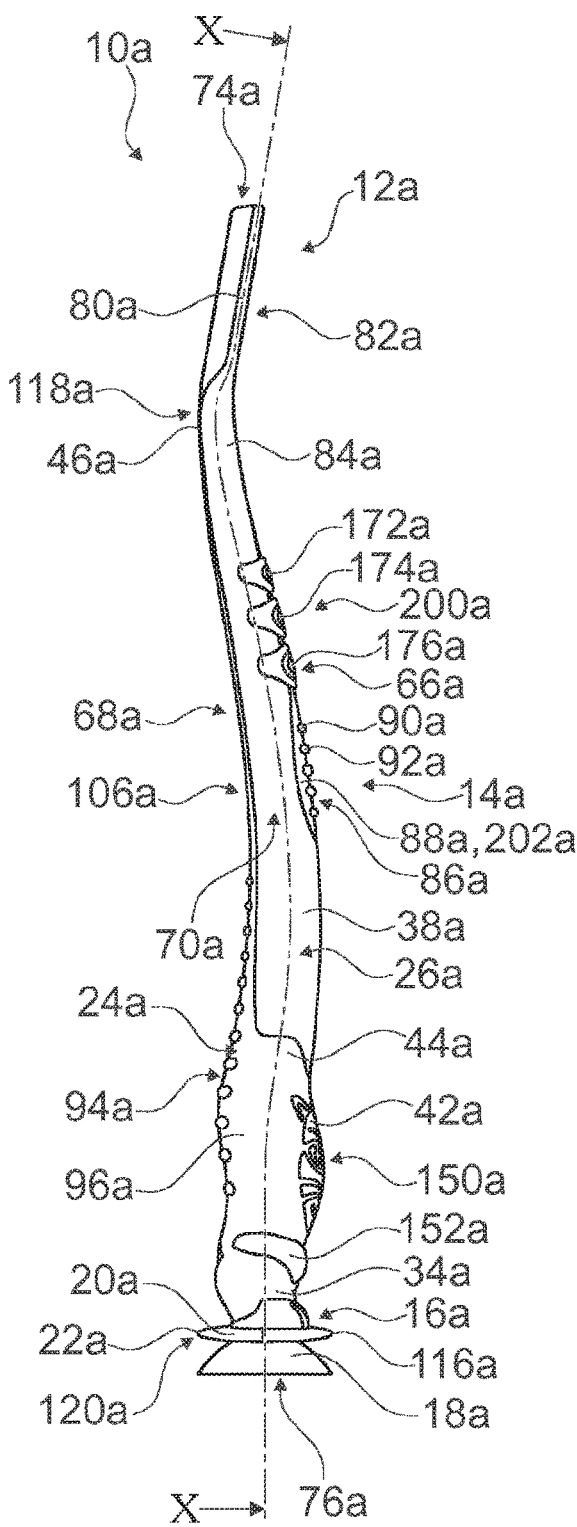
Figure 5:
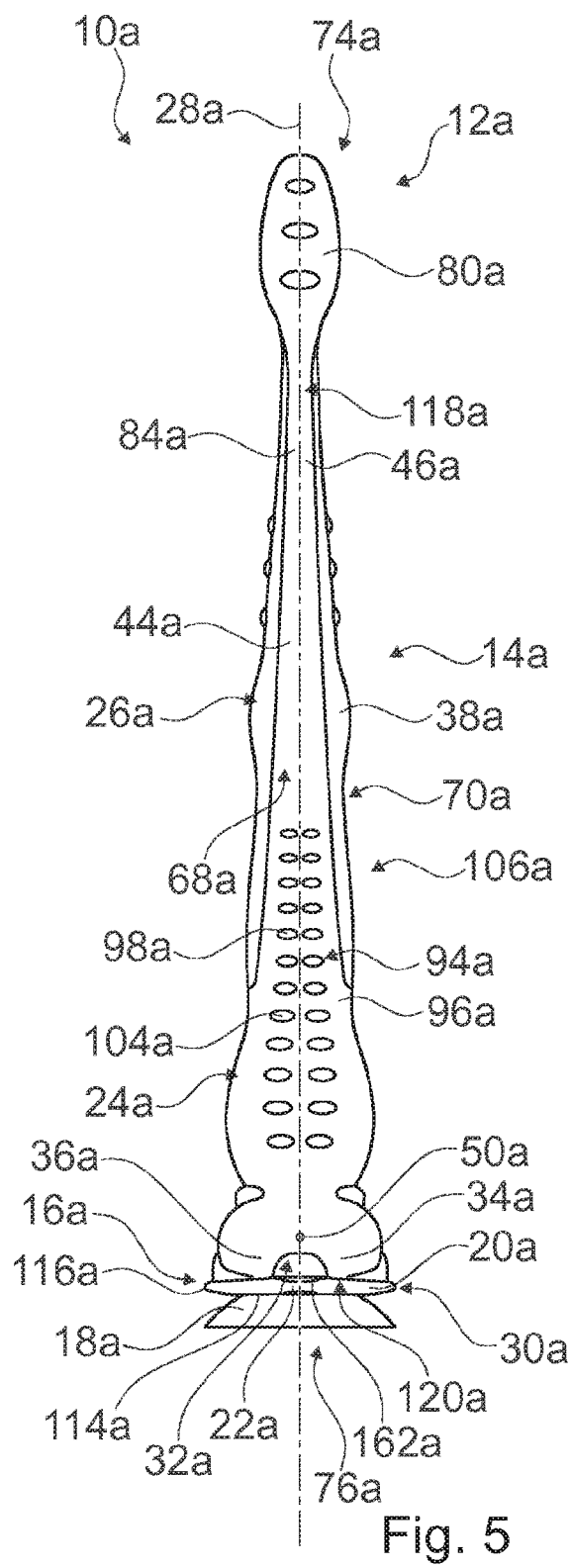
Figure 6:
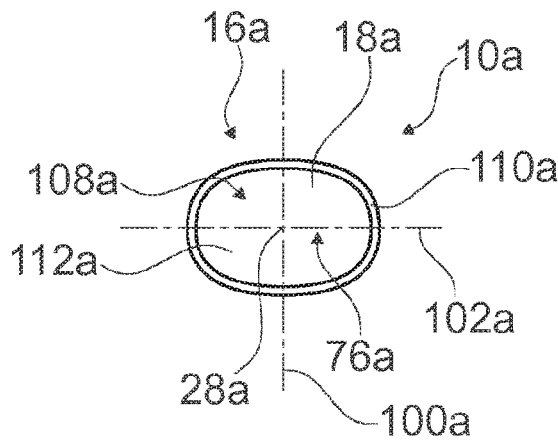
Figure 7:
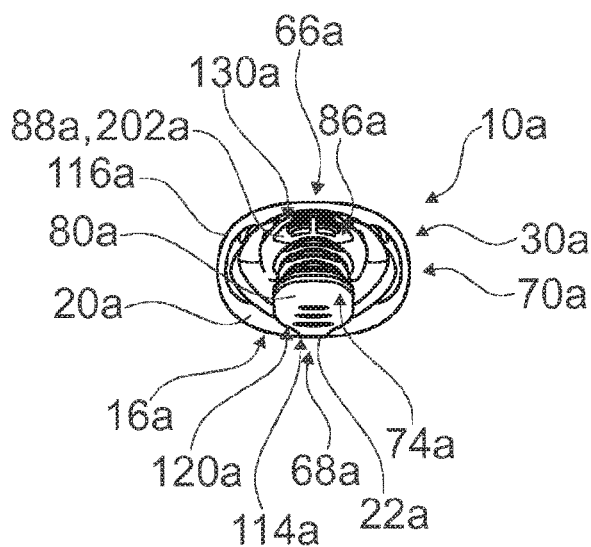
Figure 8:
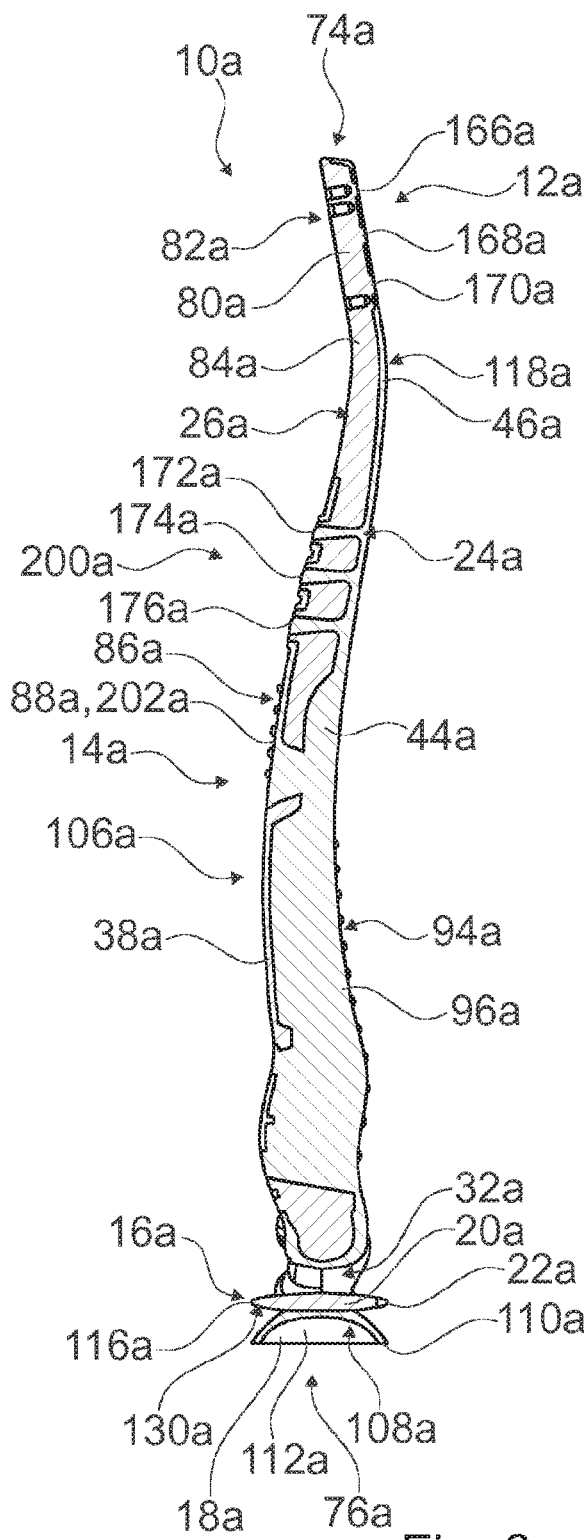
Figure 9:
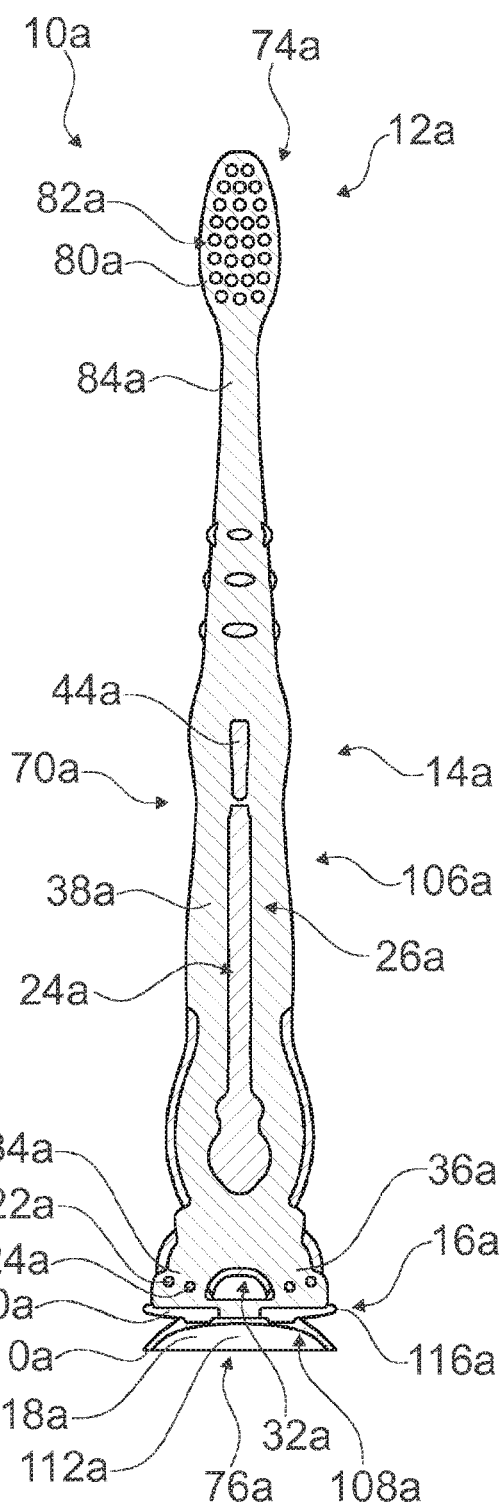
Figure 17:
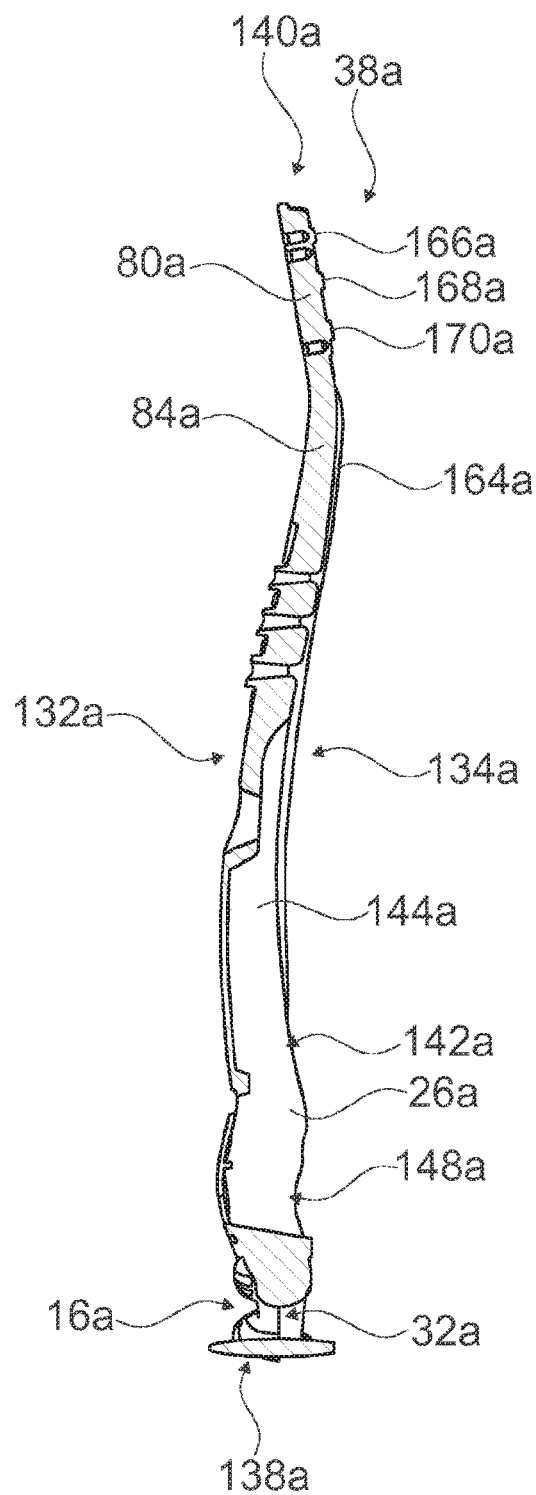
Figure 18:
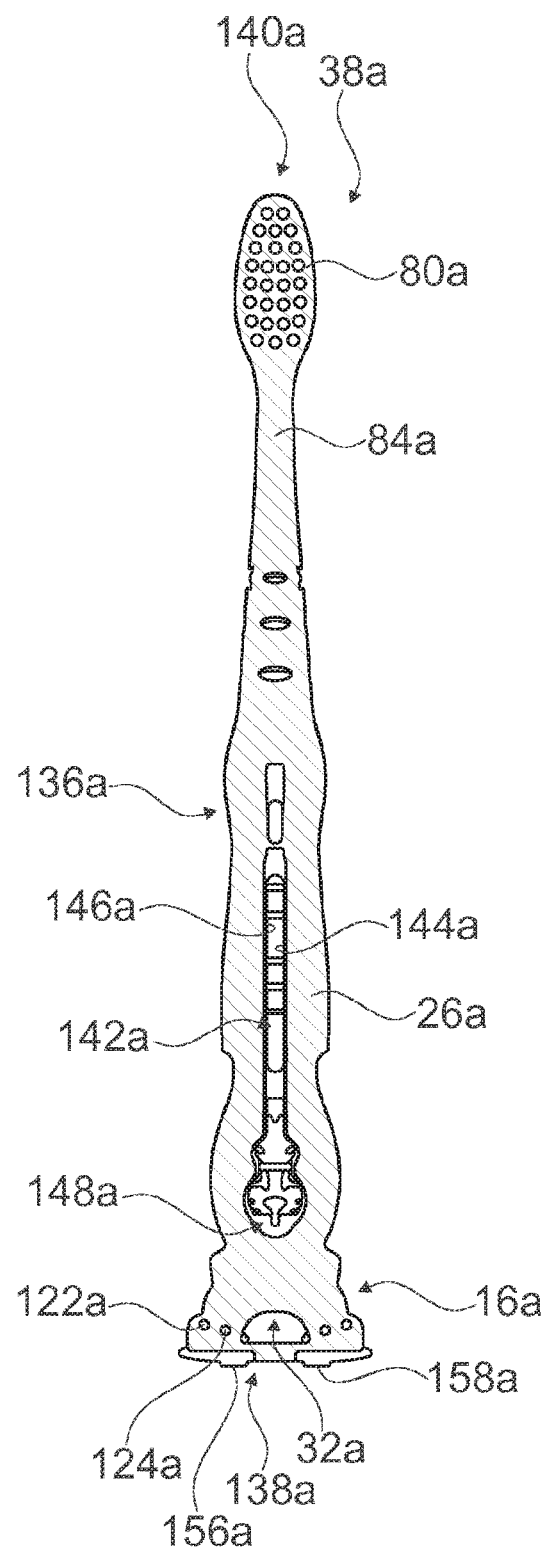
Figure 19:
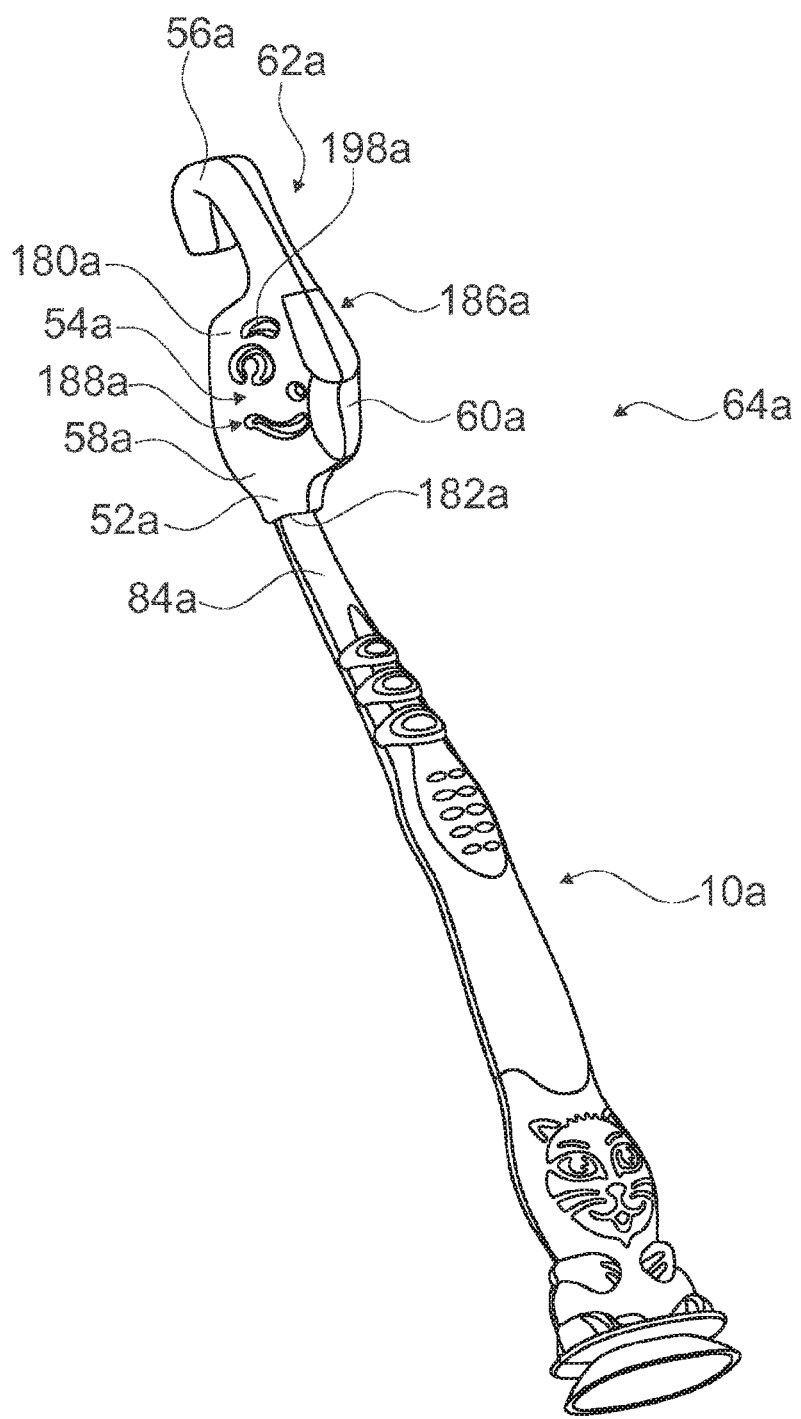
Figure 20:
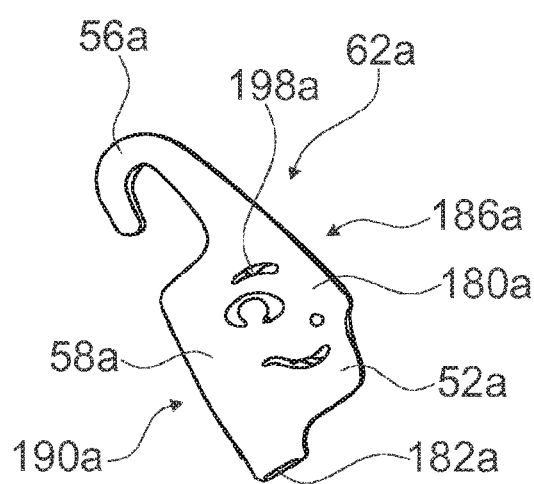
Figure 21:
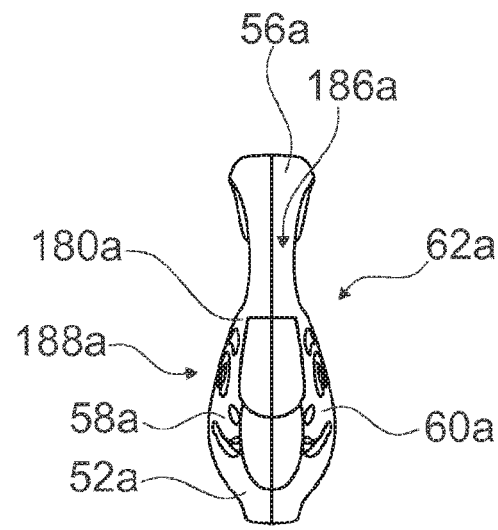
Figure 22:
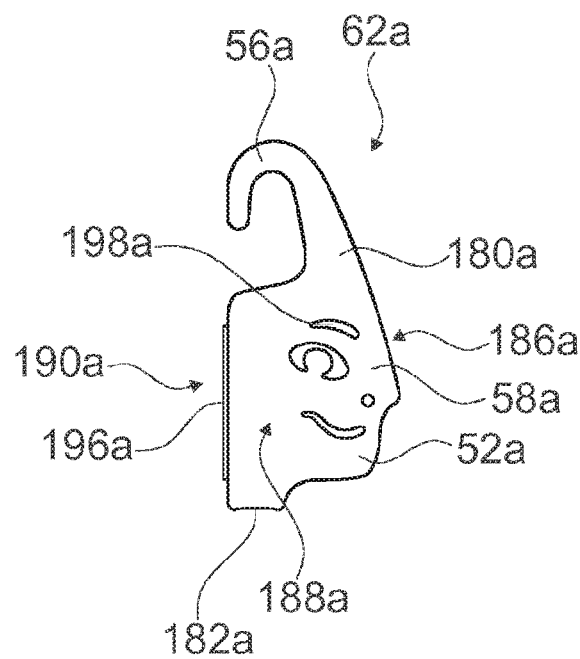
Figure 23:
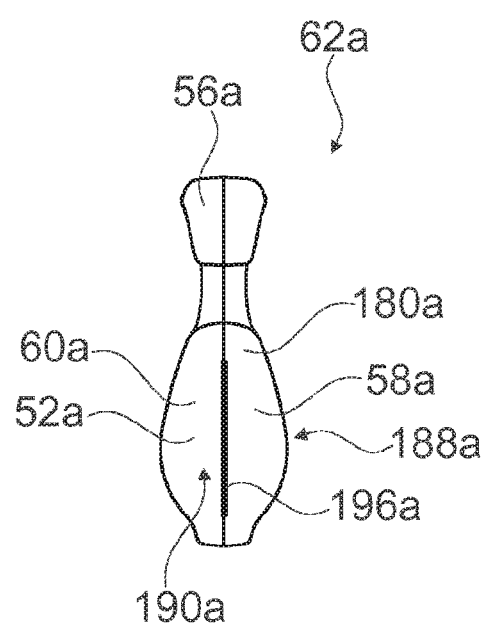
Figure 24:
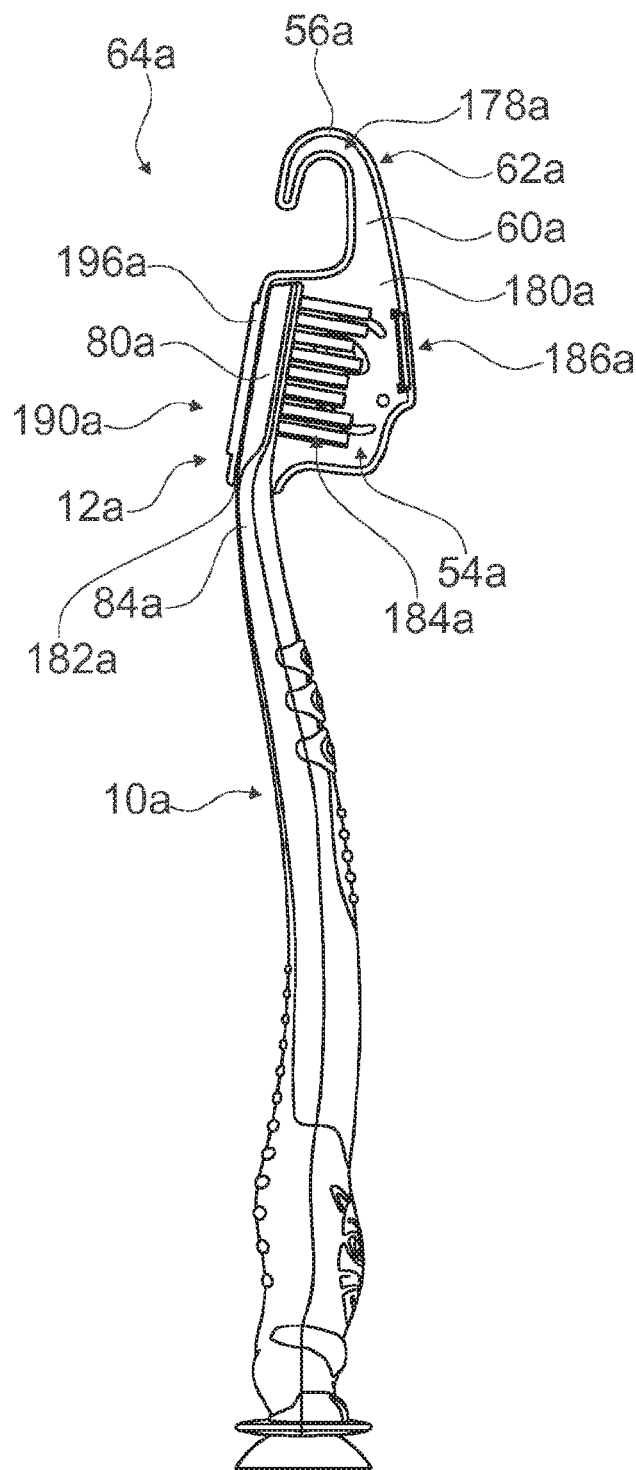
Figure 25:
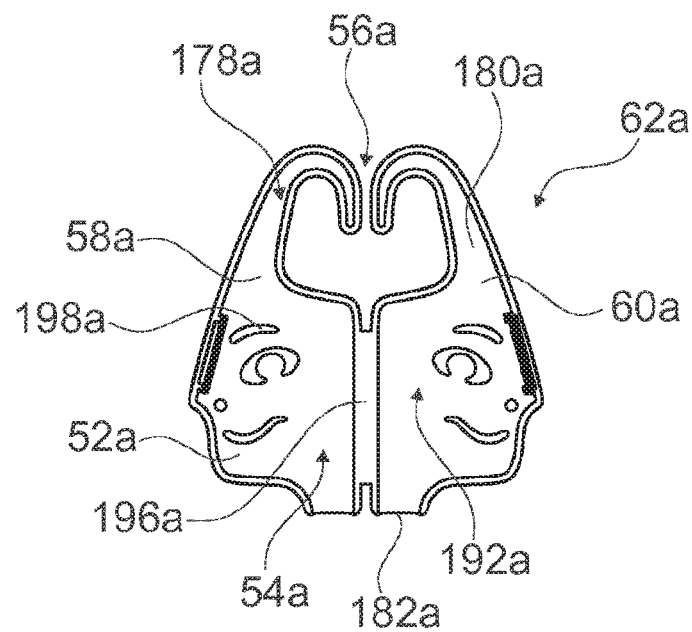
Figure 26:
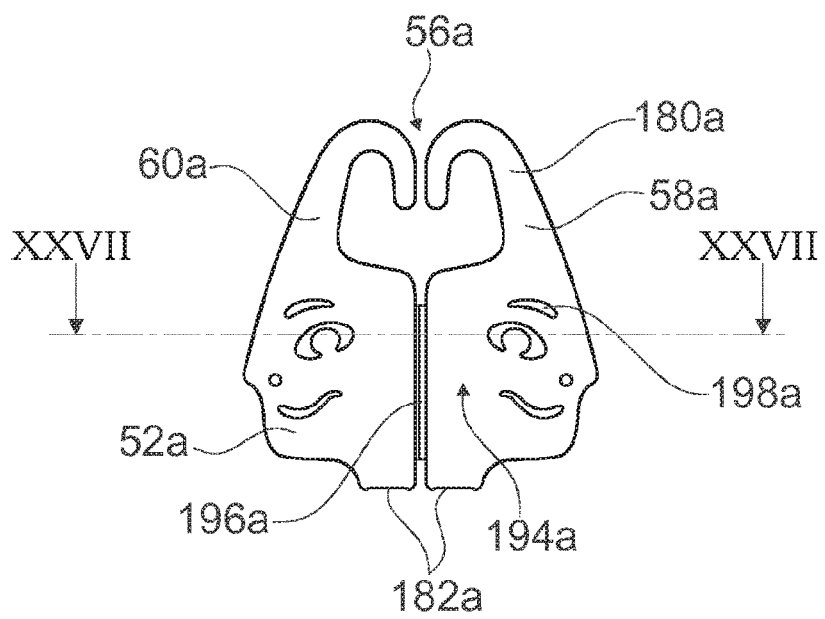
Figure 27:
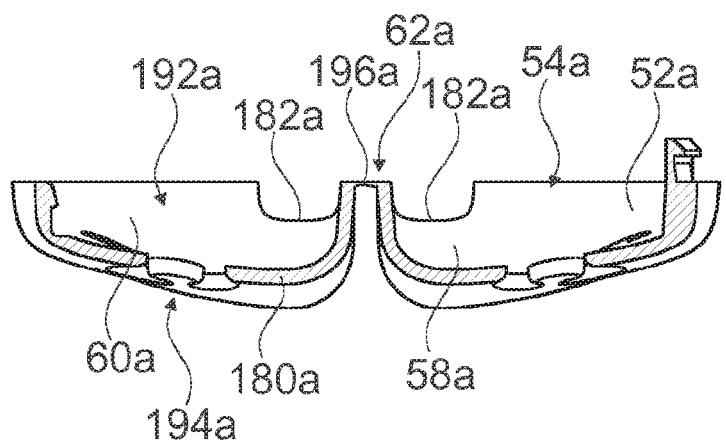
Figure 28:
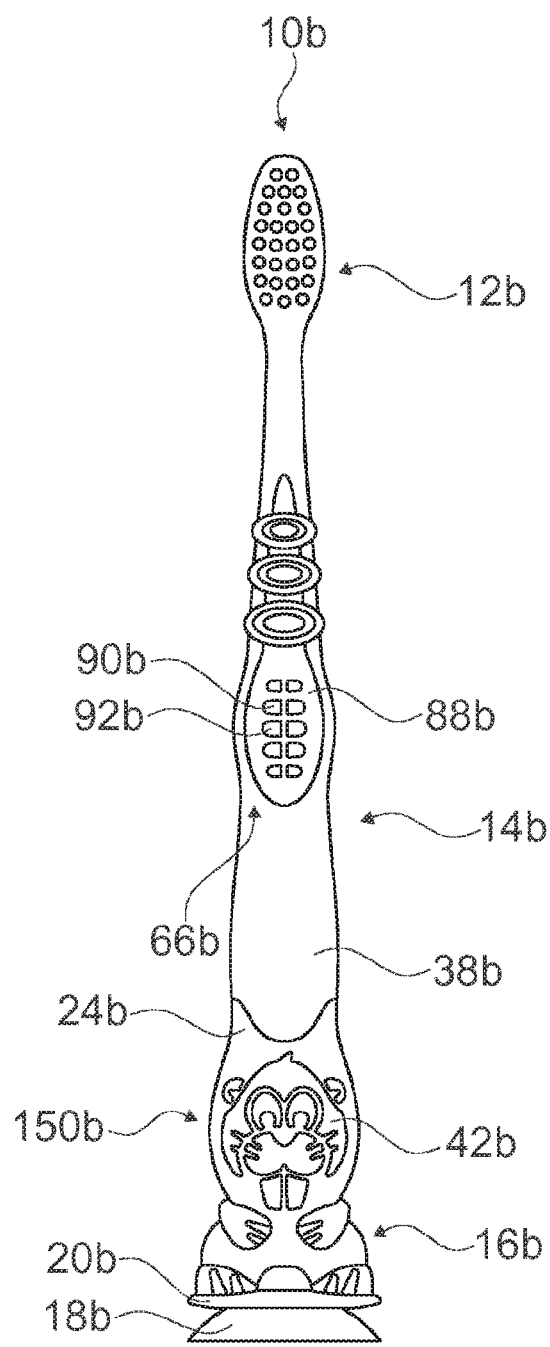
Figure 29:
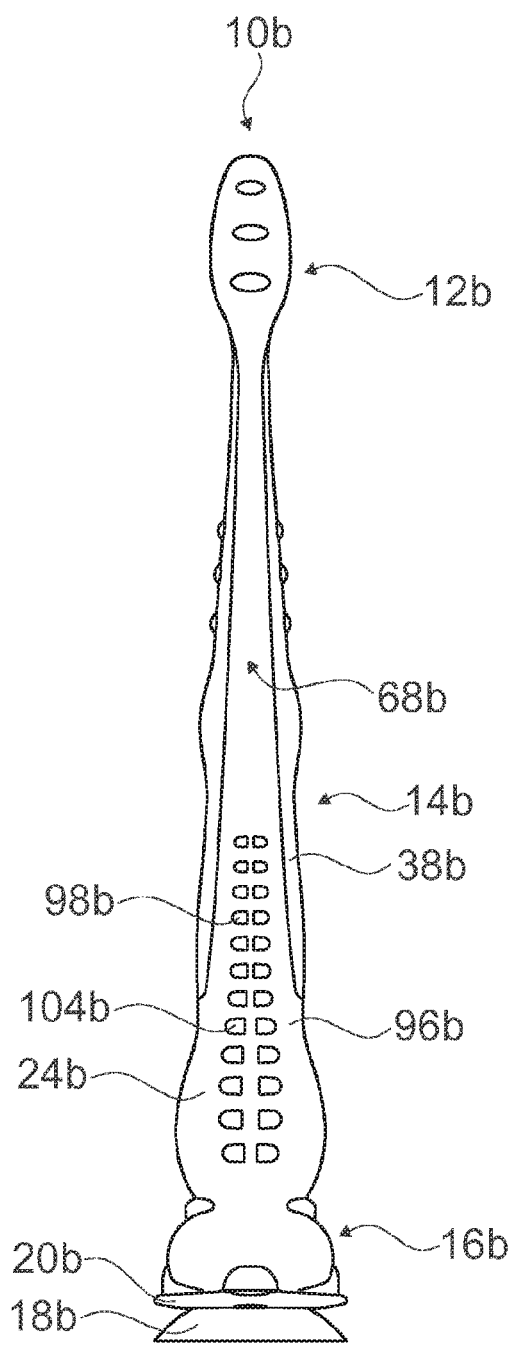
Figure 30:
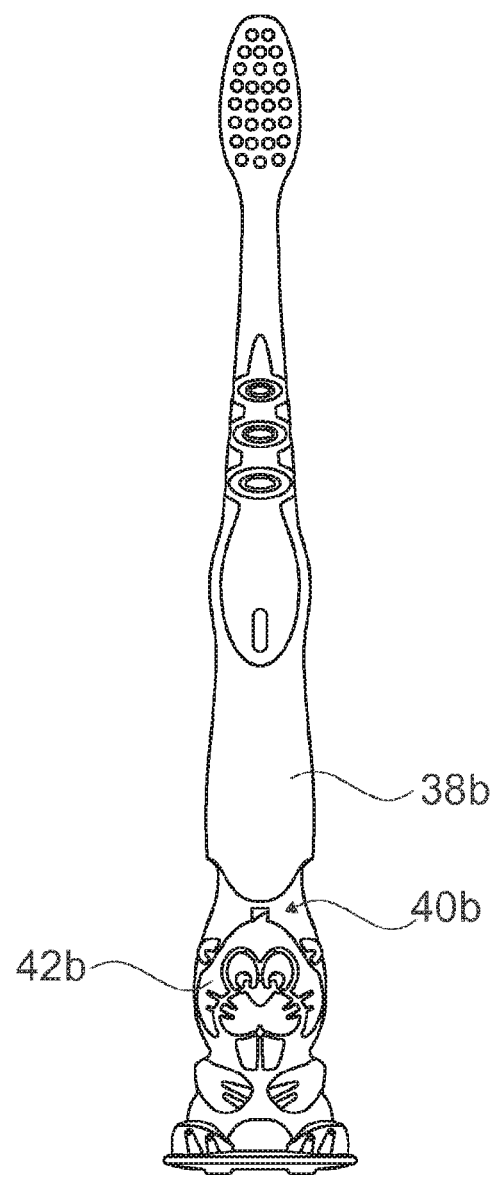
Figure 31:
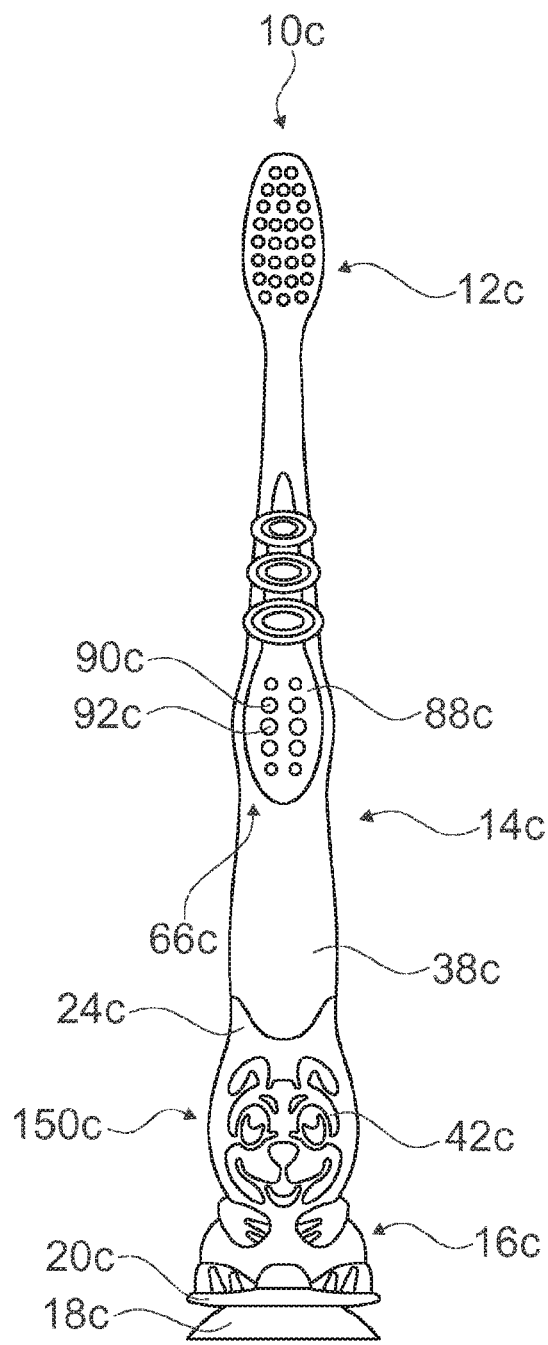
Figure 32:
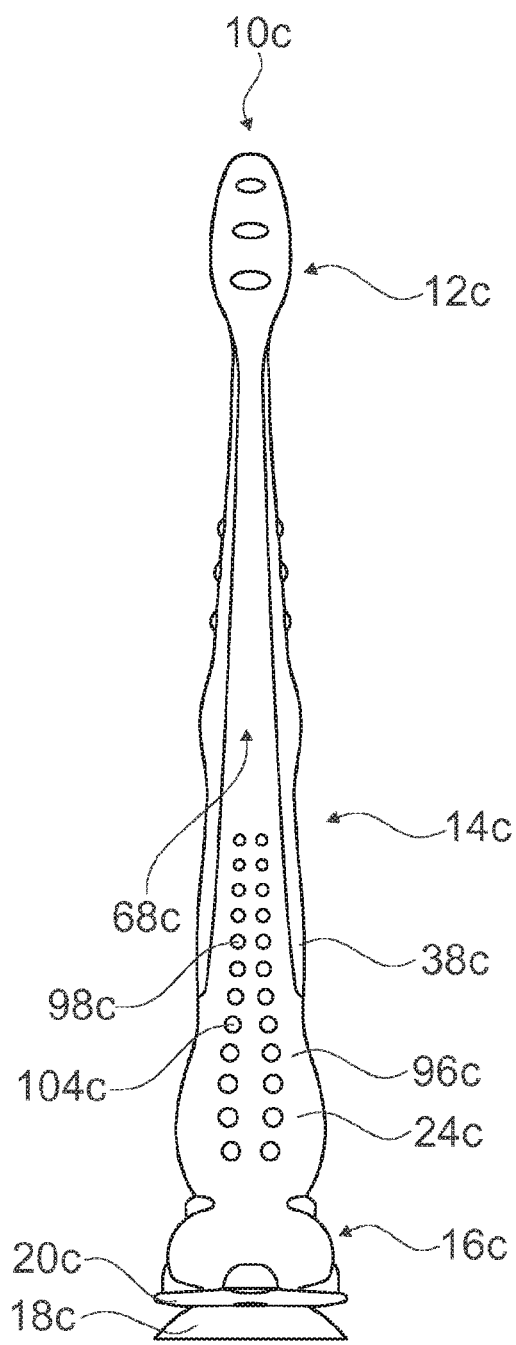
Figure 33:
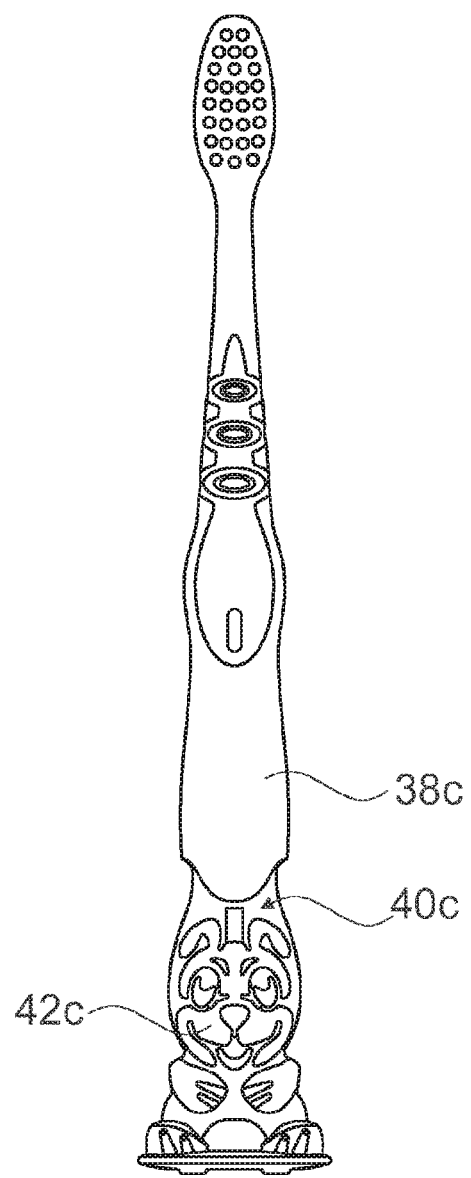
Figure 34:
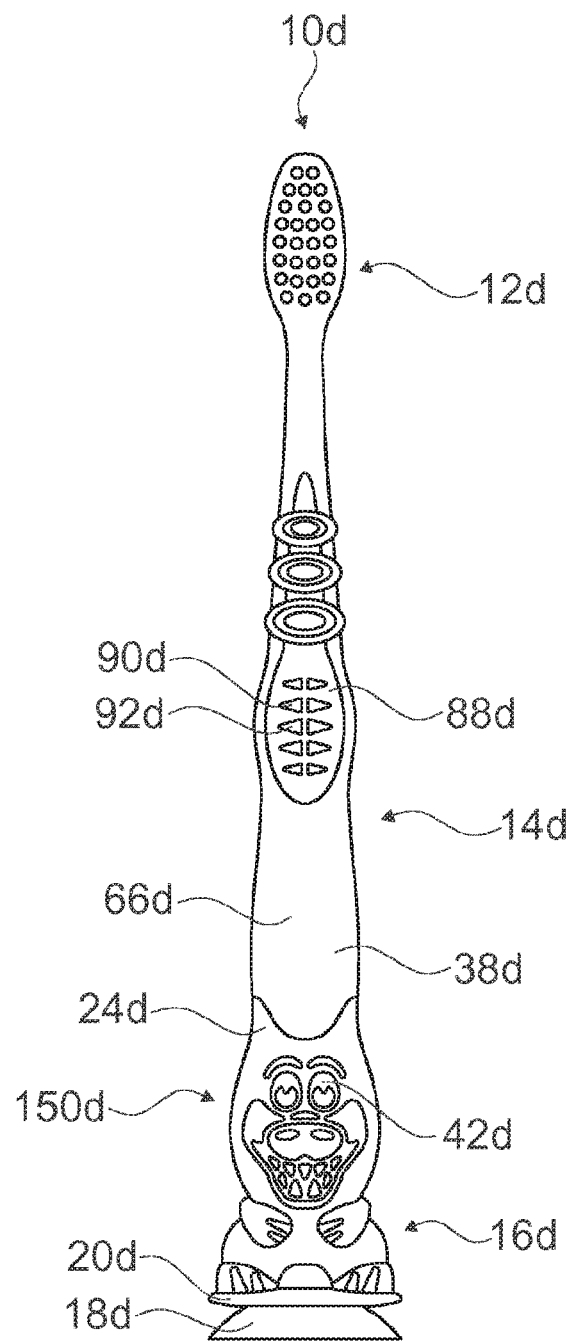
Figure 35:
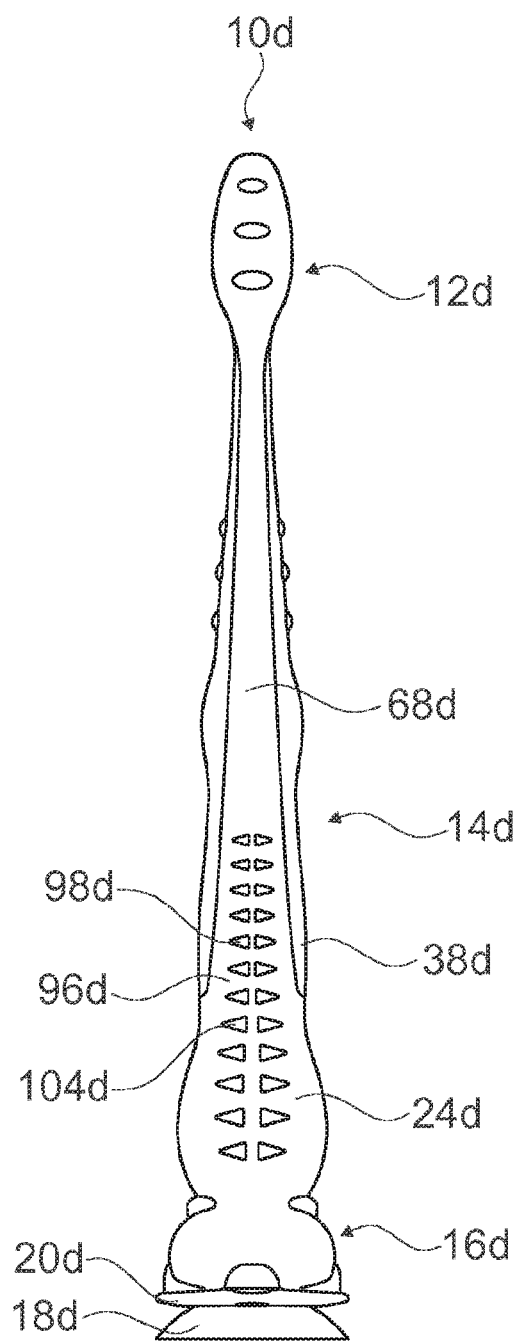
Figure 36:
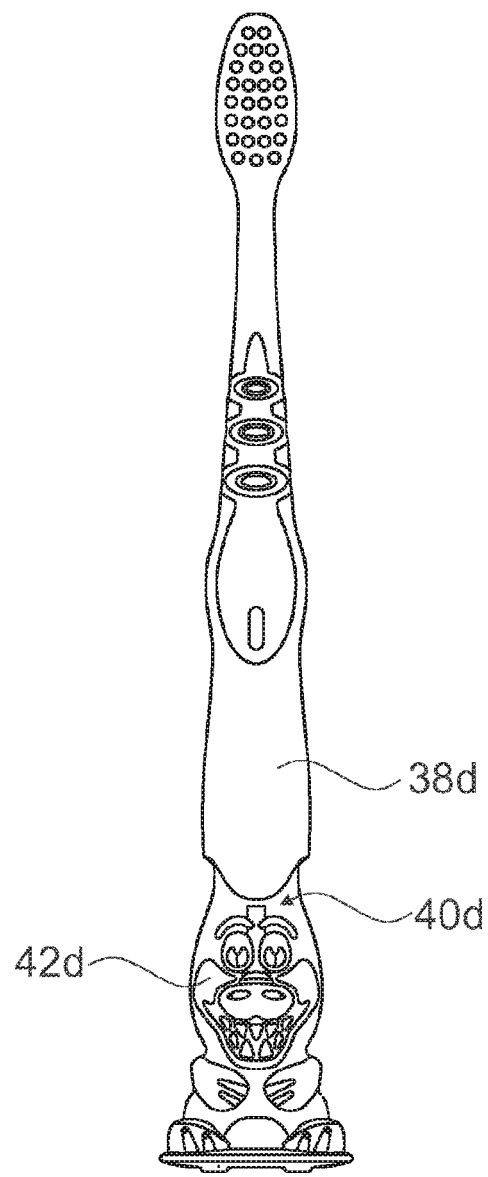

In the drawings:

FIG. 1 shows a front face of an oral hygiene means in a schematic perspective view, FIG. 2 shows a rear face of the oral hygiene means in a schematic perspective view, FIG. 3 shows the front face of the oral hygiene means in a schematic view, FIG. 4 shows a side of the oral hygiene means in a schematic view, FIG. 5 shows the rear face of the oral hygiene means in a schematic view, FIG. 6 shows an underside of the oral hygiene means in a schematic view, FIG. 7 shows an upper side of the oral hygiene means in a schematic view, FIG. 8 shows a schematic sectional view of the oral hygiene means along the cutting line VIII-VIII in FIG. 3, FIG. 9 shows a schematic sectional view of the oral hygiene means along the cutting line IX-IX in FIG. 4, FIG. 10 shows a front face of a base body of the oral hygiene means in a schematic perspective view, FIG. 11 shows a rear face of a base body in a schematic perspective view, FIG. 12 shows the front face of the base body in a schematic view, FIG. 13 shows a side of the base body in a schematic view, FIG. 14 shows the rear face of the base body in a schematic view, FIG. 15 shows an underside of the base body in a schematic view, FIG. 16 shows an upper side of the base body in a schematic view, FIG. 17 shows a schematic sectional view of the base body along the cutting line XVII-XVII in FIG. 12, FIG. 18 shows a schematic sectional view of the base body along the cutting line XVIII-XVIII in FIG. 13, FIG. 19 shows a system comprising the oral hygiene means and comprising a protective cap in a schematic perspective view, FIG. 20 shows the protective cap in a schematic perspective view, FIG. 21 shows a front face of the protective cap in a schematic view, FIG. 22 shows a side of the protective cap in a schematic view, FIG. 23 shows a rear face of the protective cap in a schematic view, FIG. 24 shows the oral hygiene means comprising a shell element of the protective cap in a schematic side view, FIG. 25 shows an inner face of the protective cap in an open state in a schematic view, FIG. 26 shows an outer face of the protective cap in the open state in a schematic view, FIG. 27 shows the protective cap in the open state in a schematic sectional view along the cutting line XXVII-XXVII in FIG. 26, FIG. 28 shows a front face of a first alternative oral hygiene means in a schematic view, FIG. 29 shows a rear face of the first alternative oral hygiene means in a schematic view, FIG. 30 shows a base body of the first alternative oral hygiene means in a schematic view, FIG. 31 shows a front face of a second alternative oral hygiene means in a schematic view, FIG. 32 shows a rear face of the second alternative oral hygiene means in a schematic view, FIG. 33 shows a base body of the second alternative oral hygiene means in a schematic view, FIG. 34 shows a front face of a third alternative oral hygiene means in a schematic view, FIG. 35 shows a rear face of the third alternative oral hygiene means in a schematic view and FIG. 36 shows a base body of the third alternative oral hygiene means in a schematic view.

DESCRIPTION OF THE EXEMPLARY EMBODIMENTS

FIG. 1 shows a front face 66a of an oral hygiene means 10a in a schematic perspective view. The oral hygiene means 10a in the present case is embodied as a toothbrush, in particular as a children's toothbrush. The oral hygiene means 10a may also be realized as a disposable toothbrush or even as a toothbrush with a disposable head. Additionally, the oral hygiene means 10a could be realized as a flosser, a single tuft brush, an interdental cleaner, a tongue cleaner or the like. Moreover, combined oral hygiene means which combine at least two different functions, for example a toothbrush with a tongue cleaner, a toothbrush with massage elements, an interdental cleaner with a flosser or the like, are conceivable.

The oral hygiene means 10a has at least one application unit 12a. Moreover, the oral hygiene means 10a has at least one grip unit 14a. Moreover, the oral hygiene means 10a has at least one fastening unit 16a with at least one suction cup 18a, which is configured for at least temporarily fastening to, in particular, smooth surfaces. The suction cup 18a has a non-circular cross section. In particular, the suction cup 18a is implemented differently from a circular suction cup.

Hereinafter reference is made to FIGS. 1 to 9, which show different views of the oral hygiene means 10a. Due to the different views some elements are not shown in all of the figures and correspondingly are not provided with reference numerals in all of the figures. FIG. 2 shows a rear face 68a of the oral hygiene means 10a in a schematic perspective view. FIG. 3 shows the front face 66a of the oral hygiene means 10a in a schematic view. FIG. 4 shows a side 70a, in particular a left-hand longitudinal side, of the oral hygiene means 10a in a schematic view. FIG. 5 shows the rear face 68a of the oral hygiene means 10a in a schematic view. FIG. 6 shows an underside 76a of the oral hygiene means 10a in a schematic view. FIG. 7 shows an upper side 74a of the oral hygiene means 10a in a schematic view. FIG. 8 shows a schematic sectional view of the oral hygiene means 10a along the cutting line VIII-VIII in FIG. 3. Finally, FIG. 9 shows a schematic sectional view of the oral hygiene means 10a along the cutting line IX-IX in FIG. 4.

The oral hygiene means 10a has a longitudinal axis 28a, a height axis 100a and a width axis 102a (see FIG. 6). The longitudinal axis 28a is arranged parallel to a main extension direction of the oral hygiene means 10a. If the oral hygiene means 10a is placed with the rear face 68a on a planar surface, so that the longitudinal axis 28a is arranged parallel to the surface, the height axis 100a is arranged perpendicular to the longitudinal axis 28a and perpendicular to the surface. The width axis 102a is arranged perpendicular to the longitudinal axis 28a and perpendicular to the height axis 100a. In the present case, the oral hygiene means 10a has a length, in particular parallel to the longitudinal axis 28a, of approximately 167 mm. Moreover, the oral hygiene means 10a has a height, in particular, parallel to the height axis 100a, of approximately 19 mm. Additionally, the oral hygiene means 10a has a width, in particular parallel to the width axis 102a, of approximately 27 mm.

The application unit 12a comprises at least one brush head 80a which in the present case is embodied as a toothbrush head. The brush head 80a comprises at least one cleaning region 82a which comprises a plurality of bristle bundles. For reasons of clarity, in FIGS. 1 to 9, the bristle bundles are not shown. Any suitable bristles are relevant as bristles, which may be punched on and/or injection-molded as described above, for example. Bristle bundles may differ regarding the length, the composition, the number of bristles, a bristle material, a color, a surface structuring and the like. The angles at which the bristles and/or the bristle bundles are arranged relative to one another and/or to a surface of the brush head 80a may also vary between bristles and/or between bristle bundles. Moreover, in the present case the application unit 12a comprises at least one neck element 84a which, in particular, connects the brush head 80a to the grip unit 14a.

The application unit 12a is arranged on the upper side 74a of the oral hygiene means 10a. The application unit 12a forms an uppermost point of the oral hygiene means 10a. The application unit 12a is implemented partially of a soft component 24a and partially of a hard component 26a. Relative to suitable soft and hard components, reference is made to the above description. In the present case, the hard component 26a, for example, is a polypropylene (PP). Additionally, in the present case the soft component 24a, for example, is a thermoplastic elastomer. In particular, the brush head 80a and/or the neck element 84 are implemented partially of the soft component 24a and partially of the hard component 26a.

The grip unit 14a has at least one thumb grip region 86a. The thumb grip region 86a has at least one thumb grip element 88a. The thumb grip element 88a is implemented of a soft component 24a. The thumb grip element 88a is realized in a one-part implementation. In the present case, the thumb grip element 88a is implemented on a surface of the oral hygiene means 10a as a pocket made of a soft component 24a surrounded by a hard component 26a. The thumb grip element 88a is arranged on the front face 66a of the oral hygiene means 10a. The thumb grip element 88a has a plurality of surface structure elements 90a, 92a, for reasons of clarity only some thereof being provided with reference numerals. In the present case, the thumb grip element 88a has ten surface structure elements 90a, 92a arranged in pairs. The surface structure elements 90a, 92a in the present case are realized as flattened raised portions of material and have, in particular, an oval cross section, wherein any other geometries are conceivable. Equally, recesses are conceivable. The thumb grip element 88a forms the surface structure elements 90a, 92a.

Moreover, the grip unit 14a has at least one handle region 94a. The handle region 94a comprises at least one handle element 96a. The handle element 96a in the present case is arranged on the rear face 68a of the oral hygiene means 10a. The handle element 96a comprises a plurality of surface structure elements 98a, 104a, which for reasons of clarity are not all provided with reference numerals. The surface structure elements 98a, 104a are geometrically similar to those of the thumb grip element 88a and, in particular, implemented in a similar manner thereto. Moreover, a size of the surface structure elements 98a, 104a alters along the longitudinal axis 28a, wherein the centrally arranged surface structure elements 98a, 104a are larger than those arranged on the edge. In the case of the thumb grip element 88a, in the present case a size of the surface structure elements 90a, 92a alters in a similar manner. The handle region 94a further comprises an entire central portion 106a of the oral hygiene means 10a which, for example, may be grasped by a hand during use. In particular, for example, in the retained state, a thumb comes to rest on the thumb grip element 88a whilst the inner faces of the remaining fingers come to rest on the handle element 96a.

The oral hygiene means 10a has a plurality of convex sections and concave sections which are distributed along the longitudinal axis 28a thereof. In the present case, the oral hygiene means 10a, in a view of the front face 66a thereof, has six convex sections and five constrictions. Preferably, the transitions between the convex sections and constrictions are rounded in this case but also straight transitions are conceivable. Moreover, the oral hygiene means 10a, in a view of the side 70a thereof, is implemented to be slightly curved, whereby advantageously in the known manner in particular spring characteristics of the application unit 12a are produced. The person skilled in the art will adapt a shaping of the oral hygiene means 10a expediently and relative to the application. Preferably, a center of gravity of the oral hygiene means 10a is located in the vicinity of the underside 76a thereof and in particular closer to the underside 76a than the upper side 74a, so that a stable position may be achieved. In the present case, the oral hygiene means 10a is thickened in a lower region of the grip unit 14a and in a region of the fastening unit 16a and/or has the most material there.

A main extension plane of the suction cup 18a in the present case is arranged perpendicular to the longitudinal axis 28a of the oral hygiene means 10a. Preferably, the longitudinal axis 28a of the oral hygiene means 10a runs through a geometric central point and/or through a center of gravity of the suction cup 18a. In particular, the cross section of the suction cup 18a is arranged perpendicular to the longitudinal axis 28a of the oral hygiene means 10a, point-symmetrically to the longitudinal axis 28a of the oral hygiene means 10a. The suction cup 18a is arranged on the underside 76a of the oral hygiene means 10a and/or on an underside of the fastening unit 16a. The suction cup 18a forms the lowermost point of the oral hygiene means 10a. The suction cup 18a is implemented in the present case of the soft component 24a. The suction cup 18a is realized in a one-part implementation. The suction cup 18a is injection-molded. By means of the suction cup 18a the oral hygiene means 10a is attachable, in particular, to a smooth surface, wherein this suction cup is advantageously compressed parallel to the longitudinal axis 28a, so that a vacuum is formed in an interior space 108a of the suction cup 18a. The vacuum thus produces a fastening force. In an undeformed state, the suction cup 18a is of bell-shaped configuration.

The suction cup 18a is oval. In particular, the suction cup 18a is realized as an oval suction cup. The suction cup 18a has a non-circular cross section perpendicular to the longitudinal axis 28a. The cross section is implemented to be perpendicular to the longitudinal axis 28a, in particular oval. In the present case, the suction cup 18a is ovoid and, in particular, ovoid segment-shaped. The suction cup 18a has an oval cross section, viewed from the underside 76a. As described above, however, other in particular non-circular cross sections are also conceivable. The suction cup 18a has an annular positioning surface 110a (see FIG. 6). The positioning surface 110a is oval ring-shaped. In a state fastened to a surface, at least the positioning surface 110a is in contact with the surface. Additionally, in particular in the case of a strong contact pressure, parts of an inner face 112a of the suction cup 18a may also be in contact with the surface.

The suction cup 18a has in the present case a width, in particular parallel to the width axis 102a of the oral hygiene means 10a, of approximately 27 mm. Additionally, the suction cup 18a in the present case has a length, in particular parallel to the height axis 100a of the oral hygiene means 10a, of approximately 19 mm. Moreover, the suction cup 18a in the present case has a height, in particular parallel to the longitudinal axis 28a of the oral hygiene means 10a, of approximately 5 mm. The specified dimensions of the suction cup 18a refer in this case, in particular, to the undeformed state thereof.

The suction cup 18a is realized at least partially in a one-part implementation with the grip unit 14a. In particular, the suction cup 18a is realized in a one-part implementation with the handle element 96a and/or with the thumb grip element 88a.

In the present case all of the elements of the oral hygiene means 10a made of the soft component 24a are produced in a common injection-molding step. The oral hygiene means 10a has at least one soft element 44a made from the soft component 24a which forms at least a portion of the fastening unit 16a and the grip unit 14a and advantageously the application unit 12a. Preferably the soft element 44a, at least apart from cleaning elements such as for example bristles of the application unit 12a, forms all of the soft component elements of the oral hygiene means 10a.

The fastening unit 16a has at least one disk-shaped carrier element 20a which is configured, in at least one deposited state, at least partially to prevent a deformation of the suction cup 18a. The deposited state, in particular, is a state in which the oral hygiene means 10a is placed on, in particular, a smooth and/or flat surface with the rear face 68a thereof. In particular, the suction cup 18a in the deposited state is without contact with the surface or is preferably in contact with this surface at least only such that said suction cup is not deformed or is deformed by less than 10%. The carrier element 20a in the present case is implemented as a disk which tapers outwardly, wherein a disk of uniform thickness is also conceivable. Additionally, the carrier element 20a in the present case is implemented as a disk which is not curved. The carrier element 20a in the present case is realized in the manner of a surfboard and/or snowboard. The carrier element 20a has an outer edge 116a which runs in a rounded and/or curved manner and which in particular runs around the longitudinal axis 28a of the oral hygiene means 10a. Advantageously, the longitudinal axis 28a runs through a geometric central point and/or through a center of gravity of the carrier element 20a. Preferably, cross sections of the carrier element 20a perpendicular to the longitudinal axis 28a of the oral hygiene means 10a are point-symmetrical to the longitudinal axis 28a of the oral hygiene means 10a. In the present case, the carrier element 20a is embodied as a stylized surfboard. A main extension plane of the carrier element 20a in the present case is arranged parallel to a main extension plane of the suction cup 18a and/or perpendicular to the longitudinal axis 28a of the oral hygiene means 10a.

The carrier element 20a defines in the deposited state at least one deposition point 22a, the oral hygiene means 10a in particular bearing thereby against the surface. In the present case, the carrier element 20a has an approximately linear deposition region 114a, which contains the deposition point 22a. The deposition region 114a is a rear portion of the outer edge 116a of the carrier element 20a. The oral hygiene means 10a in the present case has a further deposition region 118a which comprises a rear portion of the neck element 84a. At least one further deposition point 46a is arranged in the deposition region 118a. Naturally, geometries are also conceivable in which further elements of the oral hygiene means 10a form further deposition regions. In the present case, the oral hygiene means 10a is able to be stored with the deposition region 114a and the further deposition region 118a on the surface.

The carrier element 20a is implemented partially of the soft component 24a and partially of the hard component 26a. The soft component 44a forms a part of the carrier element 20a. In particular, a section 120a of the carrier element 20a arranged on the rear face 68a of the oral hygiene means 10a is made from the soft component 24a and/or from the soft element 44a. The section 120a comprises the deposition region 114a of the carrier element 20a made of the soft component 24a.

The carrier element 20a has a thickness of at most 6 mm. In the present case, the carrier element 20a has a thickness of approximately 3 mm. In particular, the carrier element 20a is thicker in a middle than at an edge.

A cross section of the carrier element 20a, in particular perpendicular to the longitudinal axis 28a of the oral hygiene means 10a, follows the cross section of the suction cup 18a, in particular perpendicular to the longitudinal axis 28a of the oral hygiene means 10a, preferably in the undeformed state of the suction cup 18a. In the present case, the carrier element 20a is oval. The carrier element 20a in the present case has a width, in particular parallel to the width axis 102a of the oral hygiene means 10a, of approximately 27 mm. Additionally, the carrier element 20a in the present case has a length, in particular parallel to the height axis 100a of the oral hygiene means 10a, of approximately 19 mm. The cross section of the carrier element 20a follows the cross section of the suction cup 18a geometrically. In the present case, the carrier element 20a is of ovoid-shaped configuration. The carrier element 20a, in particular, is implemented as a disk in the form of a flat ovoid.

In a view along the longitudinal axis 28a of the oral hygiene means 10a the cross section of the carrier element 20a is at least as large as the cross section of the suction cup 18a. In particular, in a view of the underside 76a of the oral hygiene means 10a parallel to the longitudinal axis 28a of the oral hygiene means 10a the cross section of the carrier element 20a contains the cross section of the suction cup 18a or is identical thereto. In the present case, the cross sections are identical. As described above, however, it is also conceivable that the carrier element 20a at least section-wise protrudes over the suction cup 18a, in particular on the rear face 68a of the oral hygiene means 10a, preferably at least with the deposition region 114a, so that in the deposited state the suction cup 18a is preferably stored without contact.

The fastening unit 16a, preferably the carrier element 20a, defines at least one point 30a of maximum width, in particular a maximum width of the oral hygiene means 10a. The point 30a of maximum width is arranged along the longitudinal axis 28a of the oral hygiene means 10a at the height of the carrier element 20a. In particular due to the identical cross sections, in the present case the suction cup 18a defines a further point of maximum width of the oral hygiene means 10a.

The fastening unit 16a has at least one through-passage 32a arranged above the suction cup 18a. The through-passage 32a extends in the present case from the rear face 68a to the front face 66a of the oral hygiene means 10a and, in particular, parallel to the height axis 100a of the oral hygiene means 10a. The through-passage 32a is suitable for suspending the oral hygiene means 10a, for example on a hook or a nail.

The through-passage 32a is surrounded at least section-wise by the soft component 24a. In the present case the through-passage 32a is surrounded on an upper side by the soft component 24a and on an underside by the hard component 26a. The carrier element 20a, in particular the section 130a thereof made of the hard component 26a, defines the through-passage 32a toward the suction cup 18a. The through-passage 32a is arranged directly above the carrier element 20a. The through-passage 32a is arranged on a side of the carrier element 20a remote from the suction cup 18a.

The through-passage 32a has a width, in particular minimum width, in particular parallel to the width axis 102a of the oral hygiene means 10a, of at least 4 mm. Additionally, the through-passage 32a has a height, in particular a minimum height, in particular parallel to the height axis 100a of the oral hygiene means 10a, of at least 2 mm. In the present case, a minimum height of the through-passage 32a is approximately 3 mm and/or a minimum width of the through-passage 32a is approximately 5 mm.

The fastening unit 16a has at least one connection element 34a at least partially defining the through-passage 32a. Moreover, the fastening unit 16a in the present case has at least one further connection element 36a at least partially defining the through-passage 32a. The connection elements 34a in the present case are implemented mirror-symmetrically to one another. The connection elements 34a, 36a connect the carrier element 20a to the grip unit 14a. The connection elements 34a, 36a are arranged connected to each other above the through-passage 32a and, in particular, form an arcuate upper side of the through-passage 32a. The connection elements 34a, 36a in the present case are at least partially realized in a one-part implementation with one another. The connection elements 34a, 36a and the carrier elements 20a together form the through-passage 32a and/or together surround this through-passage entirely.

The connection element 34a is implemented at least section-wise of the hard component 26a, which is penetrated by the soft component 24a. In the present case, the soft component 24a penetrates the hard component 26a of the connection element 34a in the form of two penetrations 122a, 124a, in particular from the rear face 68a to the front face 66a of the oral hygiene means 10a. The penetrations 122a, 124a are realized, in particular, as through-holes in the hard component 26a filled with the soft component 24a. Naturally a different number of penetrations 122a, 124a is conceivable. The same construction also applies to the connection element 36a.

The connection elements 34a, 36a in the present case are realized as stylized legs, in particular as animal legs which preferably stand on the carrier element 20a with feet and/or paws. Pockets 126a, 128a made of the soft component 24a, which in particular form stylized claws and/or toenails, are formed through the penetrations 122a, 124a on a front surface of the connection elements 34a, 36a. In particular, the pockets 126a, 128a on a surface of the oral hygiene means 10a are not in contact with further elements made of the soft component 24a, in particular not in contact with the section 120a made of the soft component 24a of the carrier element 20a. In particular, however, the pockets 126a, 128a are realized, through an interior space of the oral hygiene means 10a, in particular of the fastening unit 16a, in a one-part implementation with other elements made of the soft component 24a. Preferably, the soft element 44a forms the pockets 126a, 128a.

The soft element 44a is configured to form all of the deposition points 22a, 46a which are present in the deposited state. In the deposited state, the oral hygiene means 10a is exclusively located on the soft element 44a.

The soft element 44a extends on the rear face 68a of the oral hygiene means 10a without interruption from the fastening unit 16a via the grip unit 14a to the application unit 12a. In the present case, the soft element 44a extends from the suction cup 18a via the carrier element 20a, the connection elements 34a, 36a, the handle element 96a and the neck element 84a to a rear face of the brush head 80a.

The soft element 44a has a single injection-molding point 50a. The injection-molding point 50a is arranged on the rear face 68a of the oral hygiene means 10a. The injection-molding point 50a is arranged in a region above the connection elements 34a, 36a and/or below the handle element 96a.

The soft element 44a forms in at least one region 200a between the neck element 84a of the application unit 12a and a grip element 202a, in the present case the thumb grip element 88a, elements 172a, 174a, 176a which are at least partially supplied with the soft component 24a from the rear face 68a. In the present case, the elements 172a, 174a, 176a are decorative elements. The elements 172a, 174a, 176a are supplied from the rear face 68a with the soft component 24a during the production of the oral hygiene means 10a.

The oral hygiene means 10a has at least one, in particular just one, base body 38a, which is made of the hard component 26a and which forms at least a portion of the fastening unit 16a, the grip unit 14a and the application unit 12a. In the present case, the base body 38a forms all of the hard component elements of the oral hygiene means 10a, at least apart from any cleaning elements of the application unit 12a. In particular, the base body 38a forms a section 130a, which is particular a load-bearing portion, made of the hard component 26a of the carrier element 20a, onto which advantageously the suction cup 18a is injection-molded.

Hereinafter reference is made to FIGS. 10 to 18, which show various views of the base body 38a. Due to the various views, some elements are not shown in all of the figures and correspondingly not provided with reference numerals in all of the figures. Additionally, for reasons of clarity, not all of the reference numerals inserted in FIGS. 1 to 9 are shown. In the case of corresponding reference, reference is made to these figures. FIG. 10 shows a front face 132a of the base body 38a in a schematic perspective view. FIG. 11 shows a rear face 134a of the base body 38a in a schematic perspective view. FIG. 12 shows the front face 132a of the base body 38a in a schematic view. FIG. 13 shows a side 136a, in particular a left-hand longitudinal side of the base body 38a, in a schematic view. FIG. 14 shows the rear face 134a of the base body 38a in a schematic view. FIG. 15 shows an underside 138a of the base body 38a in a schematic view. FIG. 16 shows an upper side 140a of the base body 38a in a schematic view. FIG. 17 shows a schematic sectional view of the base body 38a along the cutting line XVII-XVII in FIG. 12. Finally, FIG. 18 shows a schematic sectional view of the base body 38a along the cutting line XVIII-XVIII in FIG. 13.

The base body 38a implements at least one carrier structure 40a which is arranged above the fastening unit 16a, wherein at least one motif element 42a is formed on the carrier structure 40a in a one-part implementation, and said motif element being injection-molded through the carrier structure 40a by being encapsulated with the soft component 24a (see FIGS. 1 to 9). The motif element 42a is formed from the hard component 26a. The motif element 42a is placed on the carrier structure 40a. The base body 38a has a central through-hole 142a which is arranged on the rear face 134a of the base body 38a and at least section-wise penetrates to the front face 132a of the base body 38a. When producing the oral hygiene means 10a, the soft component 24a passes from the injection-molding point 50a thereof, amongst other things through the central through-hole 142a, from the rear face 134a to the front face 132a of the base body 38a. The motif element 42a spans in the present case the central through-hole 142a. The central through-hole 142a is at least partially arranged in a region of the carrier structure 40a. In particular, the carrier structure 40a at least section-wise forms lateral side walls 144a, 146a of the central through-hole 142a. The central through-hole 142a is section-wise implemented to be sword-shaped. Additionally, the central through-hole 142a in a region of the fastening unit 16a comprises a bulged, in particular twice-bulged, widening 148a. The motif element 42a, in particular, is arranged on a front face of the widening 148a of the central through-hole 142a and is preferably supplied through said through-hole with the soft component 24a. The carrier structure 40a forms an edging of the widening 148a of the central through-hole 142a.

When injection-molding the soft component 24a this soft component flows, in particular, over at least two different paths to a region of the suction cup 18a around said region. In particular, the soft component 24a passes from the rear face 134a of the base body 38a along the connection elements 34a and 36a to a rear face of the suction cup 18a from where the entire suction cup 18a is supplied. The motif element 42a is advantageously supplied through the central through-hole 142a and externally around the carrier structure 40a with the soft component 24a, in order to form the motif 150a.

Hereinafter reference is once again made to FIGS. 1 to 9. The motif element 42a forms, amongst other things, together with its encapsulation by injection-molding a motif 150a of the oral hygiene means 10a. The motif 150a in the present case is a stylized cat, which in particular is located on the carrier element 20a. The motif 150a further comprises two arm elements 152a, 154a, which comprise stylized arms and/or front legs advantageously with paws, which comprise claws or the like made from the soft component 24a. The motif 150a further comprises the connection elements 34a, 36a which, as mentioned above, form stylized legs. As shown in the further exemplary embodiments below, the carrier structure 40a and, in particular, the arm elements 152a, 154a and/or the connection elements 34a, 36a, may be combined in an unaltered state with different motif elements 42a, so that different injection-molding processes are required only for the hard component 26a, said processes only differing as regards the motif element 42a.

Now reference is made to FIGS. 10 to 18. The base body 38a has an individual injection-molding point 160a. In a finished state of the oral hygiene means 10a, the injection-molding point 160a of the base body 38a is over-molded with the soft component 24a. The injection-molding point 160a of the base body 38a is arranged in a region of the injection-molding point 50a of the soft element 44a and preferably removed by less than 10 mm therefrom.

The base body 38a forms in the present case two support elements 156a, 158a, which are integrally formed on the carrier element 20a. The support elements 156a, 158a are implemented to be ramp-shaped. Additionally, the support elements 156a, 158a are arranged on the underside 138a of the base body 38a. The support elements 156a, 158a are also configured to form support points when ejecting the base body 38a after the injection-molding thereof. In the finished state of the oral hygiene means 10a the support elements 156a, 158a are over-molded with the soft component 24a and, in particular, inside the suction cup 18a, inside the carrier element 20a and/or arranged inside a connecting region between the suction cup 18a and the carrier element 20a.

The base body 38a additionally forms at least one web element 162a of the carrier element 20a. The web element 162a extends from the front face 132a in the direction of the rear face 134a of the base body 38a in a central region of the carrier element 20a. The web element 162a forms a rearmost point of the section 130a made of the hard component 26a of the carrier element 20a. Additionally, the web element 162a at least section-wise forms a surface of the carrier element 20a and/or a lower limit of the through-passage 32a (see also FIGS. 1 to 9). In particular, a fastening region of the suction cup 18a on the carrier element 20a is arranged below the web element 162a, so that the suction cup 18a, for example in the case of contact pressure, is advantageously stabilized by the web element 162a. Moreover, the web element 162a is configured for stabilizing the suction cup 18a during the production thereof by injection-molding.

The base body 38a further comprises at least one channel 164a which is arranged in a region of the neck element 84a of the application unit 12a. The channel 164a extends from the central through-hole 142a along the neck element 84a to the brush head 80a. During the production of the oral hygiene means 10a, the soft component 24a is supplied to the brush head 80a in particular the rear face thereof, through the channel 164a. Additionally, the soft component 24a passes through the channel 164a to the decorative elements 172a, 174a, 176a which are arranged above the thumb grip element 88a and which in each case are implemented partially of the hard component 26a and partially of the soft component 24a (see FIGS. 1 to 9).

The brush head 80a has in the present case three support elements 166a, 168a, 170a. The support elements 166a, 168a, 170a are arranged on a rear face of the brush head 80a and form in a state encapsulated by injection-molding a part of a rear surface of the brush head 80a. The support elements are configured for a support of the oral hygiene means 10a and for the ejection thereof during the production thereof. Moreover, the support elements 166a, 168a, 170a are configured for a support of the brush head 80a when the bristle bundles are punched. Naturally, a different number of support elements 166a, 168a, 170a is also conceivable, for example one or two or four or five or even more.

The base body 38a on the rear face 134a thereof is of wave-shaped configuration in a region of the brush head 80a, following the shape of the outer geometry of the bristle holes of the brush head 80a. In the present case, however, a corresponding wave-shaped region is encapsulated by injection-molding with the soft component 24a and preferably smoothed down so that in the finished product it is no longer visible.

FIG. 19 shows a system 64a with the oral hygiene means 10a and with a protective cap 62a in a schematic perspective view. The protective cap 62a is an oral hygiene means protective cap. In particular, the protective cap 62a is implemented as a toothbrush protective cap which is preferably configured for placing on a single toothbrush. In particular, in the case of a differently implemented oral hygiene means 10a, however, correspondingly the protective cap 62a may also be implemented differently. For example, this cap may be realized as a protective cap for a flosser, a tongue cleaner, a single tuft brush, an interdental cleaner or the like. The protective cap has a cap body 52a which defines at least one interior space 54a, which is configured for receiving at least a portion of the oral hygiene means 10a (see FIG. 24). In the present case, the interior space 54a is configured for receiving at least a portion of the application unit 12a and, in particular, for receiving the brush head 80a. The cap body 52a has at least one hanger 56a.

Hereinafter, reference is made to FIGS. 19 to 27, which show different views of the system 64a and the protective cap 62a. Due to the different views, a few elements are not shown in all of the figures and accordingly not provided with reference numerals in all of the figures. Additionally, for reasons of clarity, not all reference numerals inserted in FIGS. 1 to 18 of units and elements of the oral hygiene means 10a are shown. In the case of corresponding reference, reference is made to these figures. FIG. 20 shows the protective cap 62a in a schematic perspective view. FIG. 21 shows a front face 186a of the protective cap 62a in a schematic view. FIG. 22 shows a side 188a, in particular a left-hand longitudinal side of the protective cap 62a in a schematic view. FIG. 23 shows a rear face 190a of the protective cap 62a in a schematic view. FIG. 24 shows the oral hygiene means 10a with a shell element 60a of the protective cap 62a in a schematic side view. FIG. 25 shows an inner face 192a of the protective cap 62a in an open state of the protective cap 62a in a schematic view. FIG. 26 shows an outer face 194a of the protective cap 62a in the open state in a schematic view. Finally, FIG. 27 shows the protective cap 62a in the open state in a schematic sectional view along the cutting line XXVII-XXVII in FIG. 26.

In the present case, the hanger 56a is implemented to be hook-shaped. The hanger 56a is embodied as a U-shaped hook. Moreover, the hanger 56a is curved by at least 150°, advantageously by at least 170°. In a positioned state of the protective cap 62a, the hanger 56a is arranged above the brush head 80a of the oral hygiene means 10a. In particular, in the positioned state of the protective cap 62a the oral hygiene means 10a may be suspended on the hanger 56a, for example on a hook, a bar, an eye, a gripping handle, a cord or the like. In principle, other types of hanger are also conceivable, for example magnetic hangers, hangers with a suction cup, hangers with Velcro material, hangers with an eye or the like.

The hanger 56a in the present case is embodied as a hollow body. An interior space 178a of the hanger 56a is connected to the interior space 54a of the cap body 52a. The hanger 56a is integrally formed directly onto the interior space 54a. In particular, the interior space 54a of the cap body 52a and the interior space 178a of the hanger have walls which are realized in a one-part implementation.

In the present case, the cap body 52a is embodied in a one-part implementation. Additionally, in the present case, the protective cap 62a is embodied in a one-part implementation. The protective cap 62a has specifically the cap body 52a. In particular, the cap body 52a forms the protective cap 62a. It is, however, conceivable that a protective cap 62a has additional elements apart from a cap body 52a. Moreover, the cap body 52a in the present case is entirely implemented of a hard component 180a, in particular from polypropylene, wherein any hard components are conceivable. It is also conceivable that the cap body 52a has elements made of the soft component, for example sealing elements and/or bearing elements, in particular in a region of the hanger 56a.

The cap body 52a in the present case has a length of approximately 50 mm and/or a width of approximately 25 mm and/or a height of approximately 25 mm. Additionally, the cap body 52a has a wall thickness of approximately 1 mm. In particular, the wall thickness of the cap body 52a is uniform, at least in a region of the hanger 56a and/or in a region of the interior space 54a.

The cap body 52a has at least two shell elements 58a, 60a which are connected to each other in an articulated manner, in particular at least one first shell element 58a and at least one second shell element 60a which in each case form a portion of the hanger 56a. In the positioned state, the cap body 52a, in particular, is in a closed state. In the present case, the shell elements 58a, 60a form mirror-symmetrical halves of the hanger 56a. The halves of the hanger 56a in this case in a closed state of the cap body 52a directly bear against one another. However, it is also conceivable that a hanger 56a is merely implemented by a single shell element 58a, 60a and/or is fastened thereto.

The cap body 52a has a through-passage 182a, in the positioned state the neck element 84a of the oral hygiene means 10a passing through said through-passage into the interior space 54a of the cap body 52a. Preferably, a cross section of the through-passage 182a is adapted to a cross section of the neck element 84a, wherein a certain clearance may be provided. The through-passage 182a in the present case is dimensioned such that pulling the brush head 80a out of the interior space 54a through the through-passage 182a is impossible in the closed state. In particular, when the oral hygiene means 10a is suspended on the hanger the through-passage 182a is located on the bristles 184a of the brush head 80a and/or on the bristle carrier thereof. The shell elements 58a, 60a form together the through-passage 182a. When the cap body 52a is opened, the through-passage 182a is opened so that it may be placed onto the neck element 84a and when the cap body 52a is closed, it is located around the neck element 84a. Also when the cap body 52a is closed, the interior space 54a is closed around the brush head 80a.

The cap body 52a has a film hinge 196a which connects together the shell elements 58a, 60a in an articulated manner. In the present case, the cap body 52a has a single film hinge 196a. The hanger 56a, in particular, does not have a film hinge 196a. The film hinge 196a is arranged on the rear face 190a of the protective cap 62a.

Moreover, the cap body 52a has at least one ventilation hole 198a. In the present case the cap body 52a has a plurality of ventilation holes 198a, for reasons of clarity only one thereof being provided with a reference numeral. In particular, the shell elements 58a, 60a in each case have at least one ventilation hole 198a and advantageously a plurality of ventilation holes 198a. In particular, an arrangement of ventilation holes 198a of the first shell element 58a is mirror-symmetrical to an arrangement of ventilation holes 198a of the second shell element 60a. Advantageously, the ventilation holes are arranged on lateral sides 188a of the protective cap 62a and, in particular, not on the front face 186a thereof and/or on the rear face 190a thereof. In the present case, the ventilation holes 198a are implemented such that they form a stylized face. In particular, the ventilation holes 198a, for example, form a stylized mouth and/or stylized eyes and/or stylized nostrils. The protective cap 62a in this case advantageously forms a stylized face.

Further exemplary embodiments of the invention are shown in FIGS. 28 to 36. The following description is limited substantially to the differences between the exemplary embodiments, wherein relative to components, features and functions remaining the same, reference may be made to the description of the exemplary embodiments of FIGS. 1 to 27. For differentiating between the exemplary embodiments the letter a in the reference numerals of the exemplary embodiment of FIGS. 1 to 27 is replaced by the letters b to d in the reference numerals of the exemplary embodiments of FIGS. 28 to 36. Relative to components denoted the same, in particular with reference to components having the same reference numerals, in principle, reference is also made to the drawings and/or the description of the exemplary embodiment of FIGS. 1 to 27.

FIG. 28 shows a front face 66b of a first alternative oral hygiene means 10b in a schematic view. FIG. 29 shows a rear face 68b of the first alternative oral hygiene means 10b in a schematic view. FIG. 30 shows a base body 38b of the first alternative oral hygiene means 10b in a schematic view. The first alternative oral hygiene means 10a has an application unit 12b, a grip unit 14b and a fastening unit 16b. The fastening unit 16b has at least one suction cup 18b and is configured for at least temporarily fastening to surfaces. The suction cup 18b has a non-circular cross section. In particular, the suction cup 18b is oval. Additionally, the fastening unit 16b has at least one disk-shaped carrier element 20b which in at least one deposited state is configured to prevent at least partially a deformation of the suction cup 18b. In particular, the carrier element 20b is arranged directly above the suction cup 18b.

The base body 38b forms at least one carrier structure 40b arranged above the fastening unit 16b, at least one motif element 42b which is encapsulated by injection-molding through the carrier structure 40b with the soft component 24b being integrally formed thereon. In particular, the motif element 42b which is encapsulated by injection-molding forms a part of a motif 150b. The motif 150b in the present case is embodied as a stylized beaver which stands on the carrier element 20b. The motif 150b differs from that of the exemplary embodiment of FIGS. 1 to 27 only by the motif element 42b, whereas other components such as in particular stylized legs and arms are implemented identically thereto.

Additionally, the grip unit 14b has a thumb grip element 88b and a handle element 96b with surface structure elements 90b, 92b, 98b, 104b which differ relative to those of the exemplary embodiment of FIGS. 1 to 27 regarding the cross section. In the present case, the surface structure elements 90b, 92b, 98b, 104b in each case have bottom surfaces with a semi-circular portion and with a trapezoidal and/or rectangular portion adjacent thereto.

FIG. 31 shows a front face 66c of a second alternative oral hygiene means 10c in a schematic view. FIG. 32 shows a rear face 68c of the second alternative oral hygiene means 10c in a schematic view. FIG. 33 shows a base body 38c of the second alternative oral hygiene means 10c in a schematic view. The second alternative oral hygiene means 10c has an application unit 12c, a grip unit 14c and a fastening unit 16c. The fastening unit 16c has at least one suction cup 18c and is configured for at least temporarily fastening to surfaces. The suction cup 18c has a non-circular cross section. In particular, the suction cup 18c is oval. Additionally, the fastening unit 16c has at least one disk-shaped carrier element 20c which in at least one deposited state is configured to prevent at least partially a deformation of the suction cup 18c. In particular, the carrier element 20c is arranged directly above the suction cup 18c.

The base body 38c forms at least one carrier structure 40c arranged above the fastening unit 16c, at least one motif element 42c which is encapsulated by injection-molding through the carrier structure 40c with the soft component 24c being integrally formed thereon. In particular, the motif element 42c which is encapsulated by injection-molding forms a part of a motif 150c. The motif 150c in the present case is embodied as a stylized dog which stands on the carrier element 20c. The motif 150c differs from those of exemplary embodiments of FIGS. 1 to 30 only by the motif element 42c, whereas other components such as in particular stylized legs and arms are implemented identically thereto.

Additionally, the grip unit 14c has a thumb grip element 88c and a handle element 96c with surface structure elements 90c, 92c, 98c, 104c which differ relative to those of the exemplary embodiments of FIGS. 1 to 30 regarding the cross section. In the present case, the surface structure elements 90c, 92c, 98c, 104c in each case have circular bottom surfaces.

FIG. 34 shows a front face 66d of a third alternative oral hygiene means 10d in a schematic view. FIG. 35 shows a rear face 68d of the third alternative oral hygiene means 10d in a schematic view. FIG. 36 shows a base body 38d of the third alternative oral hygiene means 10d in a schematic view. The third alternative oral hygiene means 10d has an application unit 12d, a grip unit 14d and a fastening unit 16d. The fastening unit 16d has at least one suction cup 18d and is configured for at least temporarily fastening to surfaces. The suction cup 18d has a non-circular cross section. In particular, the suction cup 18d is oval. Additionally, the fastening unit 16d has at least one disk-shaped carrier element 20d which in at least one deposited state is configured to prevent at least partially a deformation of the suction cup 18d. In particular, the carrier element 20d is arranged directly above the suction cup 18d.

The base body 38d forms at least one carrier structure 40d arranged above the fastening unit 16d, at least one motif element 42d which is encapsulated by injection-molding through the carrier structure 40d with the soft component 24d being integrally formed thereon. In particular, the motif element 42d encapsulated by injection-molding forms a part of a motif 150d. The motif 150d in the present case is realized as a stylized alligator which stands on the carrier element 20d. The motif 150d differs from those of the exemplary embodiments of FIGS. 1 to 33 only by the motif element 42d, whereas other components such as in particular stylized legs and arms are implemented identically thereto.

Additionally the grip unit 14d has a thumb grip element 88d and a handle element 96d with surface structure elements 90d, 92d, 98d, 104d which differ relative to those of the exemplary embodiments of FIGS. 1 to 33 regarding the cross section. In the present case, the surface structure elements 90d, 92d, 98d, 104d in each case have triangular bottom surfaces.

The invention claimed is:
1. A toothbrush comprising:
at least one grip unit having a longitudinal axis, a first end and a second end opposite to the first end;
at least one application unit positioned at a first end of the at least one grip unit; and
at least one fastening unit that has at least one suction cup and is configured for an at least temporary fastening to surfaces, wherein:
the suction cup has a non-circular cross section, the fastening unit is located at a second end of the at least one grip unit and on an underside of the toothbrush, the fastening unit has at least one disk-shaped carrier element which is configured in a deposited state, which is a state in which the toothbrush is stored on a flat and/or smooth surface with the longitudinal axis of the toothbrush at least substantially parallel to the surface, to prevent at least partially a deformation of the suction cup, the carrier element has a thickness of at most 6 mm, a cross section of the carrier element perpendicular to the longitudinal axis follows a cross section of the suction cup, and in a view along the longitudinal axis, the cross section of the carrier element is at least as large as a cross section of the suction cup.

2. The toothbrush as claimed in claim 1, wherein the suction cup is oval.

3. The toothbrush as claimed in claim 1, wherein the suction cup has a width of at least 15 mm and/or a length of at least 10 mm.

4. The toothbrush as claimed in claim 1, wherein the suction cup is a one-part implementation with the grip unit.

5. The toothbrush as claimed in claim 1, wherein the carrier element in the deposited state defines at least one deposition point.

6. The toothbrush as claimed in claim 1, wherein the carrier element is implemented partially of a soft component and partially of a hard component.

7. The toothbrush as claimed in claim 1, wherein the fastening unit defines at least one point of maximum width.

8. The toothbrush as claimed in claim 1, wherein the fastening unit has at least one through-passage arranged above the suction cup.

9. The toothbrush as claimed in claim 8, wherein the through-passage is at least surrounded by a soft component.

10. The toothbrush as claimed in claim 8, wherein the through-passage has a width of at least 4 mm and/or a height of at least 2 mm.

11. The toothbrush as claimed in claim 8, wherein the fastening unit has at least one connection element which defines the through-passage and which is at least implemented of a hard component which is penetrated by at least one soft component.

12. The toothbrush as claimed in claim 1, further comprising at least one base body made of a hard component, which forms at least a portion of the fastening unit, the grip unit and the application unit.

13. The toothbrush as claimed in claim 12, wherein the base body forms at least one carrier structure arranged above the fastening unit, at least one motif element, which is encapsulated by injection-molding with a soft component through the carrier structure, being formed integrally on the carrier structure.

14. The toothbrush as claimed in claim 1, further comprising at least one soft element made from at least one soft component which forms at least a portion of the fastening unit and the grip unit.

15. The toothbrush as claimed in claim 14, wherein the soft element is configured to form in the deposited state all deposition points which are present.

16. The toothbrush as claimed in claim 14, wherein the soft element extends at least on a rear face without interruption from the fastening unit via the grip unit to the application unit.

17. The toothbrush as claimed in claim 14, wherein the soft element in at least one region between a neck element of the application unit and a grip element of the grip unit, forms at least one element which is at least partially supplied with at least one soft component from a rear face.

18. The toothbrush as claimed in claim 14, wherein the soft element has a single injection-molding point.

19. A protective cap attached to the toothbrush as claimed in claim 1, comprising at least one cap body, which is realized in a one-part implementation and which defines at least one interior space, which is configured for receiving at least a portion of the toothbrush, wherein the cap body has at least one hanger.

20. The protective cap as claimed in claim 19, wherein the cap body has at least two shell elements which are connected to each other in an articulated manner, wherein each of the shell elements form a portion of the hanger.

21. A system comprising the toothbrush as claimed in claim 1 and further comprising at least one protective cap.

22. A method comprising producing the toothbrush as claimed in claim 1.

* * * * *